(12) United States Patent
Kowalczyk et al.

(10) Patent No.: US 10,996,418 B2
(45) Date of Patent: May 4, 2021

(54) CONNECTING SUBSCRIBERS TO A FIBER OPTIC NETWORK USING A CABLE SPOOL

(71) Applicant: CommScope Technologies LLC, Hickory, NC (US)

(72) Inventors: Scott C. Kowalczyk, Savage, MN (US); Jonathan Walter Coan, Savage, MN (US); Jonathan R. Kaml, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/875,605

(22) Filed: Jan. 19, 2018

(65) Prior Publication Data

US 2018/0143390 A1 May 24, 2018

Related U.S. Application Data

(63) Continuation of application No. 15/470,311, filed on Mar. 27, 2017, which is a continuation of application
(Continued)

(51) Int. Cl.
*G02B 6/46* (2006.01)
*G02B 6/44* (2006.01)
*G02B 6/38* (2006.01)

(52) U.S. Cl.
CPC ......... *G02B 6/4457* (2013.01); *G02B 6/3897* (2013.01); *G02B 6/445* (2013.01);
(Continued)

(58) Field of Classification Search
CPC ........ G02B 6/46; G02B 6/445; G02B 6/4441; G02B 6/4457; G02B 6/4446;
(Continued)

(56) References Cited

U.S. PATENT DOCUMENTS 1,276,825 A 8/1918 Swope
1,442,999 A 1/1923 Boyle
(Continued)

FOREIGN PATENT DOCUMENTS

CN 1799296 A 7/2006
DE 42 26 368 A1 2/1994
(Continued)

OTHER PUBLICATIONS

7 Inch Modules, ADC Telecommunications, Inc, © 1998, "7 Inch Connector Module with IFC", pp. 127.
(Continued)

*Primary Examiner* — Akm E Ullah
(74) *Attorney, Agent, or Firm* — Merchant & Gould P.C.

(57) ABSTRACT

An enclosure for connecting a subscriber to a fiber optic network includes a rotatable cable spool disposed within a main housing. A connectorized end of a subscriber cable is routed into the main housing and plugged into an adapter disposed within the enclosure. A cover of the enclosure is closed after the subscriber cable is plugged into the adapter. Prior to connecting the subscriber cable to the adapter, an optical cable can be paid out from the cable spool. One end of the optical cable rotates in unison with the cable spool while the other end is pulled from the enclosure.

25 Claims, 14 Drawing Sheets

Related U.S. Application Data

No. 14/979,870, filed on Dec. 28, 2015, now Pat. No. 9,606,319, which is a continuation of application No. 14/539,459, filed on Nov. 12, 2014, now Pat. No. 9,261,666, which is a continuation of application No. 14/132,691, filed on Dec. 18, 2013, now Pat. No. 8,891,931, which is a continuation of application No. 13/924,191, filed on Jun. 21, 2013, now Pat. No. 8,705,929, which is a continuation of application No. 13/479,015, filed on May 23, 2012, now Pat. No. 8,494,333, which is a continuation of application No. 13/032,337, filed on Feb. 22, 2011, now Pat. No. 8,189,984, which is a continuation of application No. 12/793,556, filed on Jun. 3, 2010, now Pat. No. 7,894,701, which is a continuation of application No. 12/182,705, filed on Jul. 30, 2008, now Pat. No. 7,756,379.

(60) Provisional application No. 61/029,248, filed on Feb. 15, 2008, provisional application No. 60/954,214, filed on Aug. 6, 2007.

(52) U.S. Cl.
CPC ......... *G02B 6/4441* (2013.01); *G02B 6/4446* (2013.01); *G02B 6/4452* (2013.01); *G02B 6/4453* (2013.01); *G02B 6/4454* (2013.01); *G02B 6/4471* (2013.01); *G02B 6/46* (2013.01)

(58) Field of Classification Search
CPC .. G02B 6/4471; G02B 6/3897; G02B 6/4452; G02B 6/4453
USPC .................................................. 395/130–135
See application file for complete search history.

(56) References Cited

U.S. PATENT DOCUMENTS

| | | | |
|---|---|---|---|
| 1,446,410 | A | 2/1923 | Bennett et al. |
| 1,474,580 | A | 11/1923 | Clark et al. |
| RE20,995 | E | 2/1939 | Beasley |
| 2,282,156 | A | 5/1942 | Benes |
| 2,502,496 | A | 4/1950 | Wickman |
| 2,521,226 | A | 9/1950 | Keller |
| 2,727,703 | A | 12/1955 | Bonnett |
| 2,767,426 | A | 10/1956 | Grupp |
| 3,131,729 | A | 5/1964 | Leysinger |
| 3,346,705 | A | 10/1967 | Slinkard et al. |
| 3,433,579 | A | 3/1969 | Runnion |
| 3,585,324 | A | 6/1971 | Renndorfer et al. |
| 3,612,424 | A | 10/1971 | Friedel |
| 3,657,491 | A | 4/1972 | Ryder et al. |
| 3,667,417 | A | 6/1972 | Clinkenbeard |
| 3,837,448 | A | 9/1974 | Hagstrom |
| 3,920,308 | A | 11/1975 | Murray |
| 3,940,086 | A | 2/1976 | Stoqulet |
| 3,983,977 | A | 10/1976 | Crabb |
| 4,053,118 | A | 10/1977 | Aikins |
| 4,081,258 | A | 3/1978 | Goell et al. |
| 4,138,177 | A | 2/1979 | van Valer |
| 4,143,746 | A | 3/1979 | Lowery |
| 4,201,278 | A | 5/1980 | Balde |
| 4,379,615 | A | 4/1983 | Toda et al. |
| 4,384,688 | A | 5/1983 | Smith |
| 4,470,558 | A | 9/1984 | Stamper |
| 4,520,239 | A | 5/1985 | Schwartz |
| 4,587,801 | A | 5/1986 | Missout et al. |
| 4,635,875 | A | 1/1987 | Apple |
| 4,657,140 | A | 4/1987 | Zagar et al. |
| 4,666,237 | A | 5/1987 | Mallinson |
| 4,767,073 | A | 8/1988 | Malzacher |
| 4,869,437 | A | 9/1989 | Berz et al. |
| 4,880,182 | A | 11/1989 | Gelfman |
| 4,883,337 | A | 11/1989 | Dahlgren |
| 4,913,369 | A | 4/1990 | Lia et al. |
| 4,939,798 | A | 7/1990 | Last |
| 4,940,859 | A | 7/1990 | Peterson |
| 4,953,194 | A | 8/1990 | Hansen et al. |
| 4,953,810 | A | 9/1990 | Stadig |
| 4,968,929 | A | 11/1990 | Hauck et al. |
| 4,978,310 | A | 12/1990 | Shichida |
| 4,989,582 | A | 2/1991 | Sakiyama et al. |
| 5,016,554 | A | 5/1991 | Harris, Jr. et al. |
| 5,052,940 | A | 10/1991 | Bengal |
| 5,066,149 | A | 11/1991 | Wheeler et al. |
| 5,066,256 | A | 11/1991 | Ward, Sr. |
| 5,069,523 | A | 12/1991 | Finzel et al. |
| 5,071,211 | A | 12/1991 | Debortoli et al. |
| 5,074,863 | A | 12/1991 | Dines |
| 5,100,221 | A | 3/1992 | Carney et al. |
| 5,107,532 | A | 4/1992 | Hansen et al. |
| 5,124,606 | A * | 6/1992 | Eisenbeis ............... H02K 17/30 112/277 |
| 5,161,988 | A | 11/1992 | Krupka |
| 5,166,970 | A | 11/1992 | Ward |
| 5,167,001 | A | 11/1992 | Debortoli et al. |
| 5,172,841 | A | 12/1992 | Friedman |
| 5,185,843 | A | 2/1993 | Aberson et al. |
| 5,222,164 | A | 6/1993 | Bass, Sr. et al. |
| 5,246,377 | A | 9/1993 | Kawahara et al. |
| 5,265,187 | A | 11/1993 | Morin et al. |
| 5,265,815 | A | 11/1993 | Soyka et al. |
| 5,280,861 | A | 1/1994 | Corriveau |
| 5,305,405 | A | 4/1994 | Emmons et al. |
| 5,310,356 | A | 5/1994 | Obata et al. |
| 5,317,663 | A | 5/1994 | Beard et al. |
| 5,326,040 | A | 7/1994 | Kramer |
| 5,335,874 | A | 8/1994 | Shrum et al. |
| 5,353,367 | A | 10/1994 | Czosnowski et al. |
| 5,393,249 | A | 2/1995 | Morgenstern et al. |
| 5,394,503 | A | 2/1995 | Dietz, Jr. et al. |
| 5,413,494 | A | 5/1995 | Dewey et al. |
| 5,418,334 | A | 5/1995 | Williams |
| 5,419,717 | A | 5/1995 | Abendschein et al. |
| 5,434,944 | A | 7/1995 | Kerry et al. |
| 5,448,015 | A | 9/1995 | Jamet et al. |
| 5,448,675 | A | 9/1995 | Leone et al. |
| 5,467,062 | A | 11/1995 | Burroughs et al. |
| 5,473,715 | A | 12/1995 | Schofield et al. |
| 5,483,467 | A | 1/1996 | Krupka et al. |
| 5,490,229 | A | 2/1996 | Ghandeharizadeh et al. |
| 5,494,234 | A | 2/1996 | Kramer |
| 5,494,446 | A | 2/1996 | DeLucia et al. |
| 5,497,444 | A | 3/1996 | Wheeler |
| 5,519,275 | A | 5/1996 | Scott et al. |
| 5,522,561 | A | 6/1996 | Koyamatsu et al. |
| 5,528,453 | A | 6/1996 | Berman et al. |
| 5,544,836 | A | 8/1996 | Pera |
| 5,551,545 | A | 9/1996 | Gelfman |
| 5,613,030 | A | 3/1997 | Hoffer et al. |
| 5,638,481 | A | 6/1997 | Arnett |
| 5,641,067 | A | 6/1997 | Ellis |
| 5,657,412 | A | 8/1997 | Caudrelier |
| 5,685,741 | A | 11/1997 | Dewey et al. |
| 5,703,990 | A | 12/1997 | Robertson et al. |
| 5,709,347 | A | 1/1998 | Hoffmann et al. |
| 5,712,942 | A | 1/1998 | Jennings et al. |
| 5,717,810 | A | 2/1998 | Wheeler |
| 5,718,397 | A | 2/1998 | Stevens |
| 5,733,141 | A | 3/1998 | Penrod |
| 5,734,774 | A | 3/1998 | Morrell |
| 5,749,148 | A | 5/1998 | White, III et al. |
| 5,773,757 | A | 6/1998 | Kenney et al. |
| 5,787,219 | A | 7/1998 | Mueller et al. |
| 5,821,510 | A | 10/1998 | Cohen et al. |
| 5,854,824 | A | 12/1998 | Bengal et al. |
| 5,915,640 | A | 6/1999 | Wagter et al. |
| 5,957,401 | A | 9/1999 | O'Donnell |
| 5,987,203 | A | 11/1999 | Abel et al. |
| 5,987,207 | A | 11/1999 | Hoke |
| 5,992,787 | A | 11/1999 | Burke |
| 6,002,331 | A | 12/1999 | Laor |

(56) References Cited

U.S. PATENT DOCUMENTS

| | | | |
|---|---|---|---|
| 6,035,032 A | 3/2000 | Daoud | |
| 6,077,108 A | 6/2000 | Lorscheider et al. | |
| 6,095,837 A | 8/2000 | David et al. | |
| 6,116,961 A | 9/2000 | Henneberger et al. | |
| 6,135,254 A | 10/2000 | Liao | |
| 6,176,559 B1 | 1/2001 | Tiramani et al. | |
| 6,195,494 B1 * | 2/2001 | Abbott | G02B 6/3897 385/134 |
| 6,215,938 B1 | 4/2001 | Reitmeier et al. | |
| 6,220,413 B1 * | 4/2001 | Walters | G02B 6/4457 191/12.4 |
| 6,220,762 B1 | 4/2001 | Kanai et al. | |
| 6,222,908 B1 | 4/2001 | Bartolutti et al. | |
| 6,222,975 B1 | 4/2001 | Gilbert et al. | |
| 6,223,675 B1 | 5/2001 | Watt et al. | |
| 6,234,830 B1 | 5/2001 | Ensz et al. | |
| 6,238,235 B1 | 5/2001 | Shavit et al. | |
| 6,243,526 B1 | 6/2001 | Garibay et al. | |
| 6,285,293 B1 | 9/2001 | German et al. | |
| 6,286,777 B1 | 9/2001 | Black | |
| 6,300,877 B1 | 10/2001 | Schannach et al. | |
| 6,315,598 B1 | 11/2001 | Elliot et al. | |
| 6,330,148 B1 | 12/2001 | Won et al. | |
| 6,330,307 B1 | 12/2001 | Bloch et al. | |
| 6,349,893 B1 | 2/2002 | Daoud | |
| 6,350,148 B1 | 2/2002 | Bartolutti et al. | |
| 6,361,360 B1 | 3/2002 | Hwang et al. | |
| 6,367,347 B1 | 4/2002 | Blaschke et al. | |
| 6,419,175 B1 | 7/2002 | Rankin, VI | |
| 6,421,322 B1 | 7/2002 | Koziy et al. | |
| 6,424,710 B1 | 7/2002 | Bartolutti et al. | |
| 6,427,045 B1 * | 7/2002 | Matthes | G02B 6/445 385/134 |
| 6,427,781 B1 * | 8/2002 | Buhler | A01B 37/00 172/134 |
| 6,433,274 B1 | 8/2002 | Doss et al. | |
| 6,442,240 B1 | 8/2002 | Otto | |
| 6,456,768 B1 | 9/2002 | Boncek et al. | |
| 6,456,773 B1 | 9/2002 | Keys | |
| D466,479 S | 12/2002 | Pein et al. | |
| 6,494,396 B2 | 12/2002 | Sugata | |
| 6,499,861 B1 | 12/2002 | German et al. | |
| 6,511,009 B1 * | 1/2003 | Harrison | B65H 75/14 242/378.3 |
| 6,511,231 B2 | 1/2003 | Lampert et al. | |
| 6,522,737 B1 | 2/2003 | Bartolutti et al. | |
| 6,522,826 B2 | 2/2003 | Gregory | |
| 6,533,205 B1 * | 3/2003 | Kles | B65H 54/58 242/362 |
| 6,533,216 B1 | 3/2003 | Bumgarner et al. | |
| 6,554,221 B2 | 4/2003 | Hinds | |
| 6,554,484 B2 | 4/2003 | Lampert | |
| 6,574,586 B1 | 6/2003 | David et al. | |
| 6,591,051 B2 | 7/2003 | Solheid et al. | |
| 6,616,080 B1 | 9/2003 | Edwards et al. | |
| 6,626,697 B1 | 9/2003 | Martin et al. | |
| 6,631,237 B2 | 10/2003 | Knudsen et al. | |
| 6,636,152 B2 | 10/2003 | Schannach et al. | |
| 6,643,443 B2 | 11/2003 | Holman et al. | |
| 6,669,129 B1 | 12/2003 | Shah | |
| 6,684,179 B1 | 1/2004 | David | |
| 6,711,339 B2 | 3/2004 | Puetz et al. | |
| 6,715,619 B2 | 4/2004 | Kim et al. | |
| 6,721,484 B1 | 4/2004 | Blankenship et al. | |
| 6,725,177 B2 | 4/2004 | David et al. | |
| 6,743,044 B2 | 6/2004 | Musolf et al. | |
| 6,745,971 B1 * | 6/2004 | Renzoni | B65H 75/362 242/388.1 |
| 6,758,314 B2 | 7/2004 | Woodruff | |
| 6,760,530 B1 | 7/2004 | Mandry | |
| 6,793,408 B2 | 9/2004 | Levy et al. | |
| 6,795,633 B2 | 9/2004 | Joseph, II | |
| 6,819,854 B1 | 9/2004 | Young et al. | |
| 6,802,735 B2 | 10/2004 | Pepe et al. | |
| 6,808,116 B1 | 10/2004 | Eslambolchi et al. | |
| 6,814,624 B2 | 11/2004 | Clark et al. | |
| 6,834,517 B1 | 12/2004 | Sheehy, Jr. | |
| 6,845,207 B2 | 1/2005 | Schray | |
| 6,850,685 B2 | 2/2005 | Tinucci et al. | |
| 6,856,748 B1 | 2/2005 | Elkins, II et al. | |
| 6,885,799 B2 | 4/2005 | Lee | |
| 6,889,701 B2 | 5/2005 | Kovacik et al. | |
| 6,898,368 B2 | 5/2005 | Colombo et al. | |
| 6,901,200 B2 | 5/2005 | Schray | |
| 6,905,363 B2 | 6/2005 | Musolf et al. | |
| 6,915,058 B2 | 7/2005 | Pons | |
| 6,926,130 B2 | 8/2005 | Skowronski | |
| 6,932,517 B2 | 8/2005 | Swayze et al. | |
| 6,933,441 B2 | 8/2005 | Fuller et al. | |
| 6,937,725 B2 | 8/2005 | Liao | |
| D510,068 S | 9/2005 | Haggay et al. | |
| 6,944,387 B2 | 9/2005 | Howell et al. | |
| 6,948,680 B2 | 9/2005 | Ganster | |
| 6,961,675 B2 | 11/2005 | David | |
| 6,971,895 B2 | 12/2005 | Sago et al. | |
| 6,976,867 B2 | 12/2005 | Navarro et al. | |
| 6,997,410 B1 | 2/2006 | Huang | |
| 7,000,863 B2 | 2/2006 | Bethea et al. | |
| 7,011,538 B2 | 3/2006 | Chang | |
| 7,016,590 B2 | 3/2006 | Tanaka et al. | |
| 7,017,721 B1 | 3/2006 | Bradford et al. | |
| 7,027,704 B2 | 4/2006 | Frohlich et al. | |
| 7,036,601 B2 | 5/2006 | Berg et al. | |
| 7,050,041 B1 | 5/2006 | Smith et al. | |
| 7,052,281 B1 | 5/2006 | Meyberg et al. | |
| 7,065,282 B2 | 6/2006 | Sasaki et al. | |
| 7,077,710 B2 | 7/2006 | Haggay et al. | |
| 7,081,808 B2 | 7/2006 | Colombo et al. | |
| 7,112,090 B2 | 9/2006 | Caveney et al. | |
| 7,120,349 B2 * | 10/2006 | Elliott | G02B 6/4457 385/137 |
| 7,123,810 B2 | 10/2006 | Parrish | |
| 7,139,461 B2 | 11/2006 | Puetz et al. | |
| 7,142,764 B2 | 11/2006 | Allen et al. | |
| 7,153,142 B2 | 12/2006 | Shifris et al. | |
| 7,165,728 B2 | 1/2007 | Durrant et al. | |
| 7,190,767 B2 | 3/2007 | Kracker et al. | |
| 7,193,422 B2 | 3/2007 | Velleca et al. | |
| 7,210,858 B2 | 5/2007 | Sago et al. | |
| 7,220,144 B1 | 5/2007 | Elliot et al. | |
| 7,226,217 B1 | 6/2007 | Benton et al. | |
| 7,234,944 B2 | 6/2007 | Nordin et al. | |
| 7,297,018 B2 | 11/2007 | Caveney et al. | |
| 7,306,101 B2 | 12/2007 | Murry | |
| 7,312,715 B2 | 12/2007 | Shahs et al. | |
| D559,186 S | 1/2008 | Kelmer | |
| 7,315,224 B2 | 1/2008 | Gurovich et al. | |
| 7,315,681 B2 | 1/2008 | Kewitsch | |
| 7,346,253 B2 | 3/2008 | Bloodsworth et al. | |
| 7,352,289 B1 | 4/2008 | Harris | |
| 7,364,108 B2 | 4/2008 | Kim et al. | |
| 7,369,739 B2 | 5/2008 | Kline et al. | |
| 7,370,106 B2 | 5/2008 | Caveney | |
| 7,397,997 B2 | 7/2008 | Ferris et al. | |
| 7,399,198 B2 | 7/2008 | Thalheimer et al. | |
| 7,400,814 B1 | 7/2008 | Hendrickson et al. | |
| 7,406,242 B1 | 7/2008 | Braga | |
| 7,477,829 B2 | 1/2009 | Kaplan | |
| 7,479,032 B2 | 1/2009 | Hoath et al. | |
| 7,493,003 B2 * | 2/2009 | Kowalczyk | G02B 6/4452 385/135 |
| 7,519,000 B2 | 4/2009 | Caveney et al. | |
| 7,522,806 B2 | 4/2009 | Hendrickson et al. | |
| 7,533,841 B1 | 5/2009 | Harrison et al. | |
| 7,534,137 B2 | 5/2009 | Caveney et al. | |
| 7,546,018 B2 | 6/2009 | Hendrickson et al. | |
| 7,552,872 B2 | 6/2009 | Tokita et al. | |
| 7,570,861 B2 | 8/2009 | Smrha et al. | |
| 7,591,667 B2 | 9/2009 | Gatnau Navarro et al. | |
| 7,676,136 B2 | 3/2010 | Wakileh et al. | |
| 7,697,811 B2 | 4/2010 | Murano et al. | |
| 7,711,233 B2 | 5/2010 | Mahoney | |
| 7,715,679 B2 | 5/2010 | Kowalczyk et al. | |

(56) References Cited

U.S. PATENT DOCUMENTS

| | | |
|---|---|---|
| 7,751,672 B2 | 7/2010 | Smith et al. |
| 7,756,379 B2 | 7/2010 | Kowalczyk et al. |
| 7,809,234 B2 | 10/2010 | Smith et al. |
| 7,811,119 B2 | 10/2010 | Caveney et al. |
| 7,869,426 B2 | 1/2011 | Hough et al. |
| 7,869,682 B2 | 1/2011 | Kowalczyk et al. |
| 7,872,738 B2 | 1/2011 | Abbott |
| 7,885,505 B2 | 2/2011 | Zimmel |
| 7,894,701 B2 | 2/2011 | Kowalczyk et al. |
| 8,081,857 B2 | 12/2011 | Nair et al. |
| 8,131,126 B2 | 3/2012 | Kowalczyk et al. |
| 8,157,582 B2 | 4/2012 | Frey et al. |
| 8,189,984 B2 | 5/2012 | Kowalczyk et al. |
| 8,229,267 B2 | 7/2012 | Kowalczyk et al. |
| 8,254,740 B2 | 8/2012 | Smith et al. |
| 8,265,447 B2 | 9/2012 | Loeffelholz et al. |
| 8,326,107 B2 | 12/2012 | Cooke et al. |
| 8,380,035 B2 | 2/2013 | Kowalczyk et al. |
| 8,422,847 B2 | 4/2013 | Kowalczyk et al. |
| 8,428,419 B2 * | 4/2013 | LeBlanc ............... G02B 6/4441 385/135 |
| 8,494,333 B2 | 7/2013 | Kowalczyk et al. |
| 8,494,334 B2 | 7/2013 | Kowalczyk et al. |
| 8,565,572 B2 | 10/2013 | Krampotich et al. |
| 8,705,929 B2 | 4/2014 | Kowalczyk et al. |
| 8,818,157 B2 | 8/2014 | Burek et al. |
| RE45,153 E | 9/2014 | Hendrickson et al. |
| 8,891,931 B2 | 11/2014 | Kowalczyk et al. |
| 8,929,706 B2 | 1/2015 | Teymouri |
| 8,938,147 B2 | 1/2015 | Krampotich et al. |
| 9,170,392 B2 | 10/2015 | Krampotich et al. |
| 9,223,103 B2 | 12/2015 | Kachmar |
| 9,261,663 B2 | 2/2016 | Loeffelholz et al. |
| 9,261,666 B2 | 2/2016 | Kowalczyk et al. |
| 9,310,578 B2 | 4/2016 | Vastmans et al. |
| 9,341,802 B2 | 5/2016 | Krampotich et al. |
| 9,429,728 B2 | 8/2016 | Puetz et al. |
| 9,453,971 B2 | 9/2016 | Anderson et al. |
| 9,606,319 B2 | 3/2017 | Kowalczyk et al. |
| 9,664,871 B1 | 5/2017 | Galvan Mijangos et al. |
| 9,684,142 B2 | 6/2017 | Collart et al. |
| 9,703,063 B2 | 7/2017 | Van Baelen et al. |
| 9,766,414 B2 | 9/2017 | Marcouiller et al. |
| 9,885,846 B2 | 2/2018 | Kowalczyk et al. |
| 9,995,898 B2 | 6/2018 | Krampotich et al. |
| 10,033,463 B2 * | 7/2018 | Hubbard ............... G02B 6/4472 |
| RE47,307 E | 3/2019 | Allen |
| 10,234,648 B2 | 3/2019 | Kowalczyk et al. |
| 2001/0019002 A1 | 9/2001 | Walters et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0023984 A1 | 2/2002 | Oppmann et al. |
| 2002/0083538 A1 | 7/2002 | Silverman et al. |
| 2002/0117571 A1 | 8/2002 | Scott et al. |
| 2002/0125800 A1 | 9/2002 | Knudsen et al. |
| 2002/0126980 A1 | 9/2002 | Holman et al. |
| 2002/0164121 A1 | 11/2002 | Brennan, III et al. |
| 2002/0171002 A1 | 11/2002 | Krestsch et al. |
| 2003/0000788 A1 * | 1/2003 | Skowronski ............... H01B 7/40 191/12.2 R |
| 2003/0037480 A1 | 2/2003 | Davis |
| 2003/0042348 A1 | 3/2003 | Salentine et al. |
| 2003/0142817 A1 | 7/2003 | Liao |
| 2003/0223724 A1 * | 12/2003 | Puetz ............... G02B 6/4452 385/135 |
| 2003/0230667 A1 | 12/2003 | Ganster |
| 2004/0052498 A1 | 3/2004 | Colombo et al. |
| 2004/0065443 A1 | 4/2004 | Berg et al. |
| 2004/0084271 A1 | 5/2004 | Woodruff |
| 2004/0129522 A1 | 7/2004 | Skowronski |
| 2004/0170369 A1 | 9/2004 | Pons |
| 2004/0200332 A1 | 10/2004 | Chen |
| 2004/0209505 A1 | 10/2004 | Wade et al. |
| 2004/0240807 A1 | 12/2004 | Frohlich et al. |
| 2004/0244430 A1 | 12/2004 | Sheehy, Jr. |
| 2004/0258384 A1 | 12/2004 | Trebesch et al. |
| 2005/0002633 A1 | 1/2005 | Solheid et al. |
| 2005/0036587 A1 | 2/2005 | Kracker et al. |
| 2005/0062881 A1 | 3/2005 | Caci et al. |
| 2005/0103515 A1 * | 5/2005 | Fuller ............... G02B 6/4453 174/50 |
| 2005/0128769 A1 | 6/2005 | Gozum et al. |
| 2005/0145522 A1 | 7/2005 | Bloodworth et al. |
| 2005/0184186 A1 | 8/2005 | Tsoi et al. |
| 2005/0185910 A1 | 8/2005 | Zimmel |
| 2005/0213920 A1 | 9/2005 | Tanaka et al. |
| 2005/0247136 A1 | 11/2005 | Cross et al. |
| 2005/0258203 A1 | 11/2005 | Weaver |
| 2005/0258411 A1 | 11/2005 | Zeitler |
| 2006/0006038 A1 | 1/2006 | Beverlin |
| 2006/0028198 A1 | 2/2006 | Hoopengarner |
| 2006/0045458 A1 * | 3/2006 | Sasaki ............... G02B 6/444 385/135 |
| 2006/0054760 A1 | 3/2006 | Murry |
| 2006/0126883 A1 | 6/2006 | Thalheimer et al. |
| 2006/0148279 A1 | 7/2006 | German et al. |
| 2006/0153516 A1 | 7/2006 | Napiorkowski et al. |
| 2006/0160395 A1 | 7/2006 | Macauley et al. |
| 2006/0163403 A1 | 7/2006 | Dickson |
| 2006/0169856 A1 | 8/2006 | Dorenkamp et al. |
| 2006/0183362 A1 | 8/2006 | Mullaney et al. |
| 2006/0185953 A1 | 8/2006 | Gieseke |
| 2006/0186255 A1 | 8/2006 | Rooker |
| 2006/0187696 A1 | 8/2006 | Lanni |
| 2006/0210230 A1 * | 9/2006 | Kline ............... G02B 6/4457 385/135 |
| 2006/0231672 A1 | 10/2006 | Eastwood et al. |
| 2006/0264094 A1 | 11/2006 | Young |
| 2006/0266605 A1 | 11/2006 | Caamano et al. |
| 2006/0280418 A1 | 12/2006 | Mahoney |
| 2007/0023559 A1 | 2/2007 | Scapillato et al. |
| 2007/0025675 A1 | 2/2007 | Kramer |
| 2007/0036506 A1 * | 2/2007 | Kewitsch ............ G02B 6/4457 385/135 |
| 2007/0096538 A1 | 5/2007 | Niemi et al. |
| 2007/0108333 A1 | 5/2007 | Kuramoto |
| 2007/0165995 A1 | 7/2007 | Reagan et al. |
| 2007/0176045 A1 | 8/2007 | Chen |
| 2007/0189691 A1 | 8/2007 | Barth et al. |
| 2007/0237470 A1 | 10/2007 | Aronson et al. |
| 2008/0011990 A1 | 1/2008 | Kostet et al. |
| 2008/0013893 A1 | 1/2008 | Zheng et al. |
| 2008/0013909 A1 | 1/2008 | Kostet et al. |
| 2008/0035778 A1 | 2/2008 | Belden et al. |
| 2008/0037945 A1 | 2/2008 | Gniadek et al. |
| 2008/0093187 A1 | 4/2008 | Roberts et al. |
| 2008/0100467 A1 | 5/2008 | Downie et al. |
| 2008/0116312 A1 | 5/2008 | Eastwood et al. |
| 2008/0131132 A1 * | 6/2008 | Solheid ............... G02B 6/4441 398/117 |
| 2008/0170831 A1 | 7/2008 | Hendrickson et al. |
| 2008/0011514 A1 | 8/2008 | Zheng et al. |
| 2008/0199139 A1 | 8/2008 | Henderson |
| 2008/0218947 A1 | 9/2008 | Atkinson |
| 2008/0236209 A1 | 10/2008 | Conti et al. |
| 2008/0292261 A1 | 11/2008 | Kowalczyk et al. |
| 2008/0315030 A1 | 12/2008 | Hendrickson et al. |
| 2009/0057025 A1 | 3/2009 | Caamano et al. |
| 2009/0060441 A1 | 3/2009 | Kowalczyk et al. |
| 2009/0074370 A1 * | 3/2009 | Kowalczyk ............ G02B 6/4441 385/135 |
| 2009/0097846 A1 | 4/2009 | Kozischek et al. |
| 2009/0098763 A1 | 4/2009 | Below et al. |
| 2009/0166404 A1 | 7/2009 | German et al. |
| 2009/0190894 A1 | 7/2009 | Nhep et al. |
| 2009/0215310 A1 | 8/2009 | Hoath et al. |
| 2009/0257726 A1 | 10/2009 | Redmann et al. |
| 2009/0317047 A1 | 12/2009 | Smith et al. |
| 2010/0054680 A1 | 3/2010 | Lochkovic et al. |
| 2010/0054682 A1 | 3/2010 | Cooke |
| 2010/0054684 A1 | 3/2010 | Cooke et al. |
| 2010/0074587 A1 | 3/2010 | Loeffelholz et al. |
| 2010/0090830 A1 | 4/2010 | Conti et al. |

(56) References Cited

U.S. PATENT DOCUMENTS

| | | |
|---|---|---|
| 2010/0166376 A1 | 7/2010 | Nair et al. |
| 2010/0211664 A1 | 8/2010 | Raza et al. |
| 2010/0211665 A1 | 8/2010 | Raza et al. |
| 2010/0211697 A1 | 8/2010 | Raza et al. |
| 2010/0215049 A1 | 8/2010 | Raza et al. |
| 2010/0322583 A1 | 12/2010 | Cooke et al. |
| 2011/0044599 A1 | 2/2011 | Kowalczyk et al. |
| 2011/0092100 A1 | 4/2011 | Coffey et al. |
| 2011/0094274 A1 | 4/2011 | Conti et al. |
| 2011/0103761 A1 | 5/2011 | LeBlanc et al. |
| 2011/0158598 A1 | 6/2011 | LeBlanc et al. |
| 2013/0094828 A1 | 4/2013 | Loeffelholz et al. |
| 2013/0170810 A1 | 7/2013 | Badar et al. |
| 2013/0170811 A1 | 7/2013 | Kowalczyk et al. |
| 2013/0242866 A1 | 9/2013 | Lin et al. |
| 2014/0010512 A1 | 1/2014 | Kowalczyk et al. |
| 2014/0010513 A1 | 1/2014 | Kowalczyk et al. |
| 2014/0219622 A1 | 8/2014 | Coan et al. |
| 2015/0063770 A1 | 3/2015 | Kowalczyk et al. |
| 2015/0093088 A1 | 4/2015 | Matz et al. |
| 2017/0199344 A1 | 7/2017 | Kowalczyk et al. |
| 2017/0235079 A1 | 8/2017 | Kowalczyk et al. |
| 2018/0143386 A1* | 5/2018 | Coan .................. G02B 6/3897 |
| 2018/0299632 A1* | 10/2018 | Van Baelen ......... G02B 6/4466 |

FOREIGN PATENT DOCUMENTS

| | | |
|---|---|---|
| DE | 102 44 304 B3 | 3/2004 |
| EP | 1 107 031 A1 | 6/2001 |
| EP | 2 618 195 A2 | 7/2013 |
| FR | 2 566 997 A1 | 1/1986 |
| GB | 2 236 398 A | 4/1991 |
| JP | 1-123203 A | 5/1989 |
| JP | 9-236709 | 9/1997 |
| JP | 11-87006 A | 3/1999 |
| JP | 11-349230 | 12/1999 |
| JP | 2003-114339 | 4/2003 |
| JP | 2005-73365 | 3/2005 |
| JP | 2005-249858 | 9/2005 |
| JP | 2007-121598 | 5/2007 |
| JP | 2007-121609 | 5/2007 |
| WO | WO 2009/048680 A1 | 4/2009 |
| WO | WO 2010/001400 A1 | 1/2010 |
| WO | WO 2010/081186 A1 | 7/2010 |
| WO | WO 2010/121639 A1 | 10/2010 |

OTHER PUBLICATIONS

Answer, CommScope Technologies LLC v. Clearfield, Inc., Case No. 0:17-cv-00307-PJS-BRT, 27 pages (Apr. 24, 2017).
Australian Examination Report for Application No. 2015205930; dated Jul. 13, 2016; 4 pages.
Australian Office Action (Appln. No. 2008247361), dated Nov. 8, 2013.
Avaya's Enhanced SYSTIMAX® iPatch System Enables IT Managers to Optimise Network Efficiency and Cut Downtime, Press Release, May 20, 2003, obtained from http://www.avaya.com/usa/about-avaya/newsroom/news-releases/2003/pr-030520 on Jan. 7, 2009.
Complaint relating to Civil Action No. 5:11-cv-02509-JS, *ADC Telecommunications, Inc v. Opterna Am, Inc.* filed Apr. 11, 2011 (14 pages).
Complaint relating to Civil Action No. 1:11cv-735 (GBL-IDD), *ADC Telecommunications, Inc v. Opterna Am, Inc.* filed Jul. 12, 2011 (5 pages).
Complaint, *CommScope Technologies LLC v. Clearfield, Inc.*, Case No. 0:17-cv-00307, 77 pages (Jan. 31, 2017).
Complaint Exhibit G, *CommScope Technologies LLC v. Clearfield, Inc.*, Case No. 0:17-cv-00307-PJS-BRT, 3 pages (Jan. 31, 2017).
Complaint Exhibit H, *CommScope Technologies LLC v. Clearfield, Inc.*, Case No. 0:17-cv-00307-PJS-BRT, 3 pages (Jan. 31, 2017).
Defendant Clearfield Inc.'s Invalidity Claim Chart Exhibit 10, *CommScope Technologies LLC v. Clearfield, Inc.*, Case No. 0:17-cv-00307-PJS-BRT, 36 pages (Oct. 6, 2017).
Defendant Clearfield Inc.'s Invalidity Claim Chart Exhibit 11, *CommScope Technologies LLC v. Clearfield, Inc.*, Case No. 0:17-cv-00307-PJS-BRT, 60 pages (Oct. 6, 2017).
Defendant Clearfield Inc.'s Invalidity Claim Chart Table D, *CommScope Technologies LLC v. Clearfield, Inc.*, Case No. 0:17-cv-00307-PJS-BRT, 7 pages (Oct. 6, 2017).
Defendant Clearfield Inc.'s Invalidity Claim Chart Table E, *CommScope Technologies LLC v. Clearfield, Inc.*, Case No. 0:17-cv-00307-PJS-BRT, 7 pages (Oct. 6, 2017).
Defendant Clearfield Inc.'s Preliminary Invalidity Claim Charts and Disclosures, *CommScope Technologies LLC v. Clearfield, Inc.*, Case No. 0:17-cv-00307-PJS-BRT, 62 pages (Oct. 6, 2017).
Description of Admitted Prior Art, 30 pages.
European Office Action for Application No. 151182271.5-1504; dated Feb. 12, 2015, 7 pages.
European Search Report for Application No. 13163032.9 dated Jul. 4, 2013.
European Search Report for Application No. 15182271.5 dated Dec. 2, 2015.
F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products—Preconfigured Panels, ADC Telecommunications, Inc., © 2000 "Rack or Cabinet Mount Termination Panel with Multifiber Cable", pp. 13.
FL2000 Products, ADC Telecommunications, Inc., © 1994, 1996.
FL2000 Products, ADC Telecommunications, Inc., © 1994, 1996, "Rack Mount Panel with Intrafacility Fiber Cable", pp. 16.
IFC Style Frame Modules, ADC Telecommunications, Inc., © 1995, "Connector Module Equipped with IFC", pp. 27.
Intelligent patching systems carving out a 'large' niche, Cabling Installation & Maintenance, vol. 12, Issue 7, Jul. 2004 (5 pages).
intelliMAC: The intelligent way to make Moves, Adds or Changes! NORDX/CDT ©2003 (6 pages).
Petition for Inter Partes Review of U.S. Pat. No. 8,705,929, *Clearfield Inc. v. CommScope Technologies LLC*, Case No. IPR2017-02122, 67 pages (Sep. 15, 2017).
Inter Partes Review Case No. IPR2017-02122, Ex. 1003—Declaration of Dr. Michael Lebby, 141 pages (Sep. 15, 2017).
Inter Partes Review Case No. IPR2017-02122, Ex. 1004—U.S. Pat. No. 6,220,413 B1.
Inter Partes Review Case No. IPR2017-02122, Ex. 1005—U.S. Pat. No. 6,933,441 B2.
Inter Partes Review Case No. IPR2017-02122, Ex. 1006—U.S. Pat. No. 4,201,278.
Inter Partes Review Case No. IPR2017-02122, Ex. 1007—Prosecution History of U.S. Appl. No. 12/182,705, filed on Jul. 30, 2008., 332 pages.
Inter Partes Review Case No. IPR2017-02122, Ex. 1008—PCT Patent No. WO 2009/048680 A1.
Inter Partes Review Case No. IPR2017-02122, Ex. 1009—European U.S. Pat. No. 2 618 195 A2.
Inter Partes Review Case No. IPR2017-02122, Ex. 1010—EP App. No. 13163032.9.
Inter Partes Review Case No. IPR2017-02122, Ex. 1011—U.S. Pat. No. 4,657,140.
Inter Partes Review Case No. IPR2017-02122, Ex. 1012—USConec MTP® Brand Connectors Data Sheet ( © 2014), 2 pages.

(56) References Cited

OTHER PUBLICATIONS

Inter Partes Review Case No. IPR2017-02122, Ex. 1013—Katsuki Suematsu et al., "Super Low-Loss, Super High-Density Multi-Fiber Optical Connectors," Furukawa Review (n. 23), 2003 ("Suematsu").
Inter Partes Review Case No. IPR2017-02122, Ex. 1014—U.S. Pat. No. 6,885,799 B2.
International Search Report and Written Opinion for PCT/US2008/062764 dated Aug. 8, 2008.
International Search Report and Written Opinion for PCT/US2008/075196 dated Nov. 18, 2008.
International Search Report and Written Opinion for PCT/US2008/072218 dated Mar. 18, 2009.
International Search Report and Written Opinion for PCT/US2010/052872 dated Jan. 12, 2011.
International Search Report and Written Opinion for PCT/US2011/041605 dated Feb. 24, 2012.
Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Notice of Allowance for application U.S. Appl. No. 13/924,191 dated Dec. 3, 2013.
Ohtsuki, F. et al., "Design of Optical Connectors with ID Modules," *Electronics and Communications in Japan*, Part 1, vol. 77, No. 2, pp. 94-105 (Feb. 1994).
Plaintiff CommScope Technologies LLC's Memorandum in Support of Motion to Compel Discovery, *CommScope Technologies LLC v. Clearfield, Inc.*, Case No. 0:17-cv-00307-PJS-BRT, 21 pages (Oct. 9, 2017).
Plaintiff CommScope Technologies LLC's Response to Defendant's First Set of Interrogatories to Plaintiff (Nos. 1-15), *CommScope Technologies LLC v. Clearfield, Inc.*, Case No. 0:17-cv-00307-PJS-BRT, 26 pages (Oct. 9, 2017).
Plaintiff CommScope Technologies LLC's Supplemental Response to Defendant's Interrogatory No. 2, *CommScope Technologies LLC v. Clearfield, Inc.*, Case No. 0:17-cv-00307-PJS-BRT, 5 pages (Oct. 9, 2017).
Plaintiff CommScope's Initial Claim Charts including Exhibits J and K, *CommScope Technologies LLC v. Clearfield, Inc.*, Case No. 0:17-cv-00307-PJS-BRT, 28 pages (Oct. 9, 2017).
Plaintiff's Notice of Dismissal relating to Civil Action No. 5:11-cv-02509-JS, *ADC Telecommunications, Inc v. Opterna Am, Inc.* filed Jul. 12, 2011 (1 page).
Supplemental Notice of Allowability for application U.S. Appl. No. 13/924,191 dated Mar. 10, 2014.
Supplemental Notice of Allowability for application U.S. Appl. No. 13/924,191 dated Mar. 14, 2014.
SYSTIMAX® iPatch System Wins Platinum Network of the Year Award, Press Release, Jan. 30, 2003, obtained from http://www.avaya.com/usa/about-avaya/newsroom/news-releases/2003/pr-030130a on Jan. 7, 2009.
TrueNet; TFP Series Rack Mount Fiber Panels, Spec Sheet; May 2008; 8 pages.

Value-Added Module System, ADC Telecommunications, Inc., © 1993, 1194, 1998, "12-Pack Module Assemblies", pp. 30-31.
Preliminary Response by Patent Owner Under 37 C.F.R. § 42.107, Case IPR2017-02122, Paper No. 6, 71 pages. (Dec. 22, 2017).
Ex. 2001—Declaration of Casimer DeCusatis in Support of Patent Owner's Preliminary Response, Case IPR2017-02122.
Ex. 2002—Office Action dated Jun. 19, 2009 in connection with U.S. Appl. No. 12/182,705.
Ex. 2003—Response to Jun. 19, 2009 Office Action in connection with U.S. Appl. No. 12/182,705.
Ex. 2004—U.S. Patent Application Publication No. 2006/021 0230 ("Kline").
Ex. 2005—Excerpts from the Merriam-Webster's Collegiate Dictionary (Tenth Edition) (2000).
Ex. 2006—Excerpts from the New Oxford American Dictionary (Third Edition) (2010).
Defendant Clearfield Inc.'s Revised Preliminary Invalidity Claim Charts and Disclosures, Civil Action No. 17-cv-00307-PJS-BRT, 51 pages (Dec. 11, 2017).
Defendant Clearfield Inc.'s Revised Invalidity Claim Chart Exhibit 10, *CommScope Technologies LLC v. Clearfield, Inc.*, Case No. 0:17-cv-00307-PJS-BRT, 38 pages (Dec. 11, 2017).
Defendant Clearfield Inc.'s Revised Invalidity Claim Chart Exhibit 11, *CommScope Technologies LLC v. Clearfield, Inc.*, Case No. 0:17-cv-00307-PJS-BRT, 39 pages (Dec. 11, 2017).
Defendant Clearfield Inc.'s Revised Invalidity Claim Chart Table D, *CommScope Technologies LLC v. Clearfield, Inc.*, Case No. 0:17-cv-00307-PJS-BRT, 7 pages (Dec. 11, 2017).
Defendant Clearfield Inc.'s Revised Invalidity Claim Chart Table E, *CommScope Technologies LLC v. Clearfield, Inc.*, Case No. 0:17-cv-00307-PJS-BRT, 6 pages (Dec. 11, 2017).
Defendant Clearfield Inc.'s Second Revised Preliminary Invalidity Claim Charts and Disclosures, Civil Action No. 17-cv-00307-PJS-BRT, 65 pages (Jan. 12, 2018).
Exhibit 10 to Second Revised Preliminary Invalidity Claim Charts and Disclosures, Civil Action No. 17-cv-00307-PJS-BRT, 43 pages (Jan. 12, 2018).
Exhibit 11 to Second Revised Preliminary Invalidity Claim Charts and Disclosures, Civil Action No. 17-cv-00307-PJS-BRT, 47 pages (Jan. 12, 2018).
Commscope's Response to Clearfield's Second Revised Invalidity Claim Charts and Disclosure, Civil Action No. 17-cv-00307-PJS-BRT, 105 pages (Jan. 19, 2018).
Exhibit J to Second Revised Preliminary Invalidity Claim Charts and Disclosures, Civil Action No. 17-cv-00307-PJS-BRT, 21 pages (Jan. 19, 2018).
Exhibit K to Second Revised Preliminary Invalidity Claim Charts and Disclosures, Civil Action No. 17-cv-00307-PJS-BRT, 19 pages (Jan. 19, 2018).
Joint Status Report, *CommScope Technologies LLC v. Clearfield, Inc.*, Case No. 0:17-cv-00307-PJS-BRT, 11 pages (Feb. 9, 2018.
Joint Status Report Exhibit A, *CommScope Technologies LLC v. Clearfield, Inc.*, Case No. 0:17-cv-00307-PJS-BRT, 33 pages (Feb. 9, 2018).
Joint Status Report Exhibit B, *CommScope Technologies LLC v. Clearfield, Inc.*, Case No. 0:17-cv-00307-PJS-BRT, 21 pages (Feb. 9, 2018).
Stipulation of Dismissal, *CommScope Technologies LLC v. Clearfield, Inc.*, Case No. 0:17-cv-00307-PJS-BRT, 2 pages (Feb. 19, 2018).
Order of Dismissal, *CommScope Technologies LLC v. Clearfield, Inc.*, Case No. 0:17-cv-00307-PJS-BRT, 1 page (Feb. 20, 2018).

\* cited by examiner

CONNECTING SUBSCRIBERS TO A FIBER OPTIC NETWORK USING A CABLE SPOOL

CROSS-REFERENCE TO RELATED APPLICATIONS

This application is a continuation of application Ser. No. 15/470,311, filed Mar. 27, 2017, now U.S. Pat. No. 10,712,518, which is a continuation of application Ser. No. 14/979,870, filed Dec. 28, 2015, now U.S. Pat. No. 9,606,319, which is a continuation of application Ser. No. 14/539,459, filed Nov. 12, 2014, now U.S. Pat. No. 9,261,666, which is a continuation of application Ser. No. 14/132,691, filed Dec. 18, 2013, now U.S. Pat. No. 8,891,931, which is a continuation of application Ser. No. 13/924,191, filed Jun. 21, 2013, now U.S. Pat. No. 8,705,929, which is a continuation of application Ser. No. 13/479,015, filed May 23, 2012, now U.S. Pat. No. 8,494,333, which is a continuation of application Ser. No. 13/032,337, filed Feb. 22, 2011, now U.S. Pat. No. 8,189,984, which is a continuation of application Ser. No. 12/793,556, filed Jun. 3, 2010, now U.S. Pat. No. 7,894,701, which is a continuation of application Ser. No. 12/182,705, filed Jul. 30, 2008, now U.S. Pat. No. 7,756,379, which application claims the benefit of provisional application Ser. Nos. 61/029,248, filed Feb. 15, 2008 and 60/954,214, filed Aug. 6, 2007, which applications are incorporated herein by reference in their entirety.

TECHNICAL FIELD

The present disclosure relates to fiber optic enclosure, and more particularly, to a fiber optic enclosure with cable payout.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure assembly for enclosing optical fiber connections. The fiber optic enclosure assembly includes a housing having an interior region and a bearing mount disposed in the interior region of the housing. A cable spool is connectedly engaged with the bearing mount such that the cable spool selectively rotates within the housing. A termination module is disposed on the cable spool so that the termination module rotates in unison with the cable spool.

Another aspect of the present disclosure relates to a method of paying out a fiber optic cable from a fiber optic enclosure. The method includes rotating a cable spool, which has a subscriber cable coiled around a spooling portion of the cable spool, about an axis of a housing of the fiber optic enclosure until a desired length of subscriber cable is paid out. The cable spool is disposed in an interior region of the fiber optic enclosure and a termination module is disposed on the cable spool.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
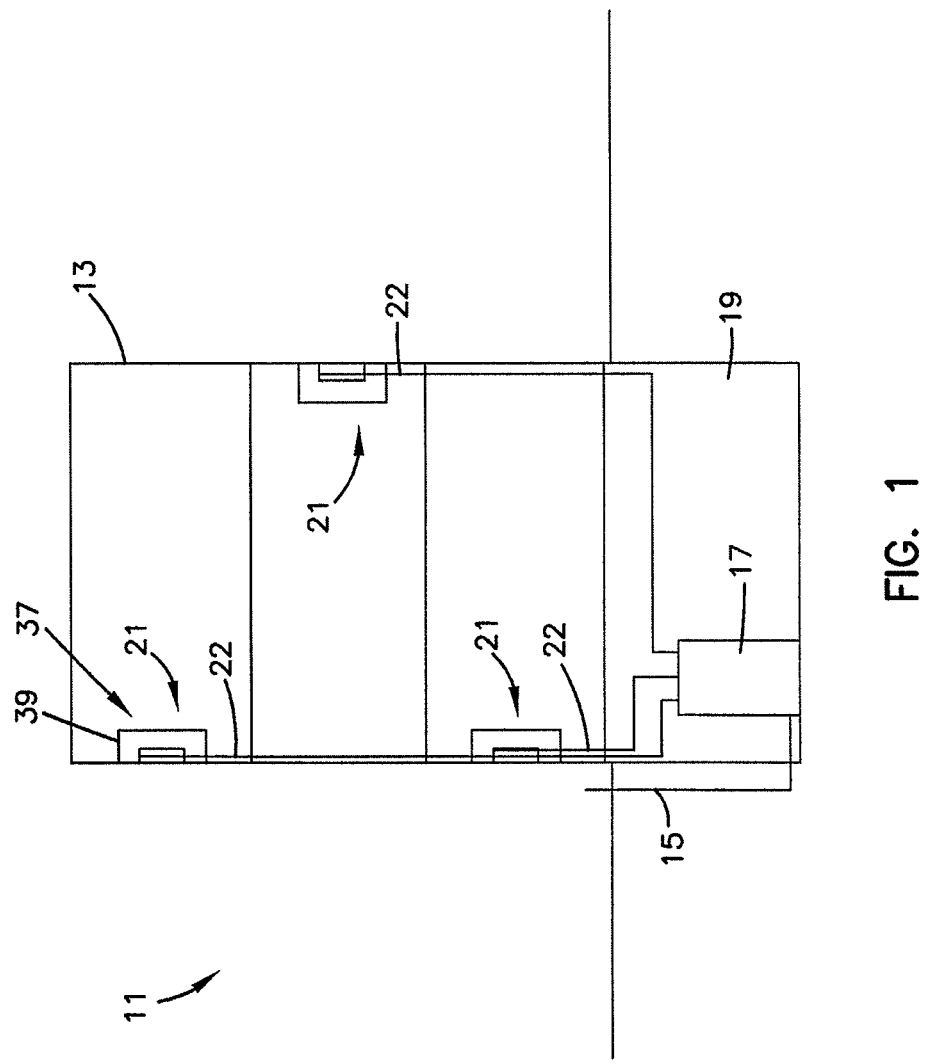
FIG. 1 is a schematic representation of a fiber optic network that includes a fiber optic enclosure having features that are examples of inventive aspects in accordance with the principles of the present disclosure.
Figure 2:
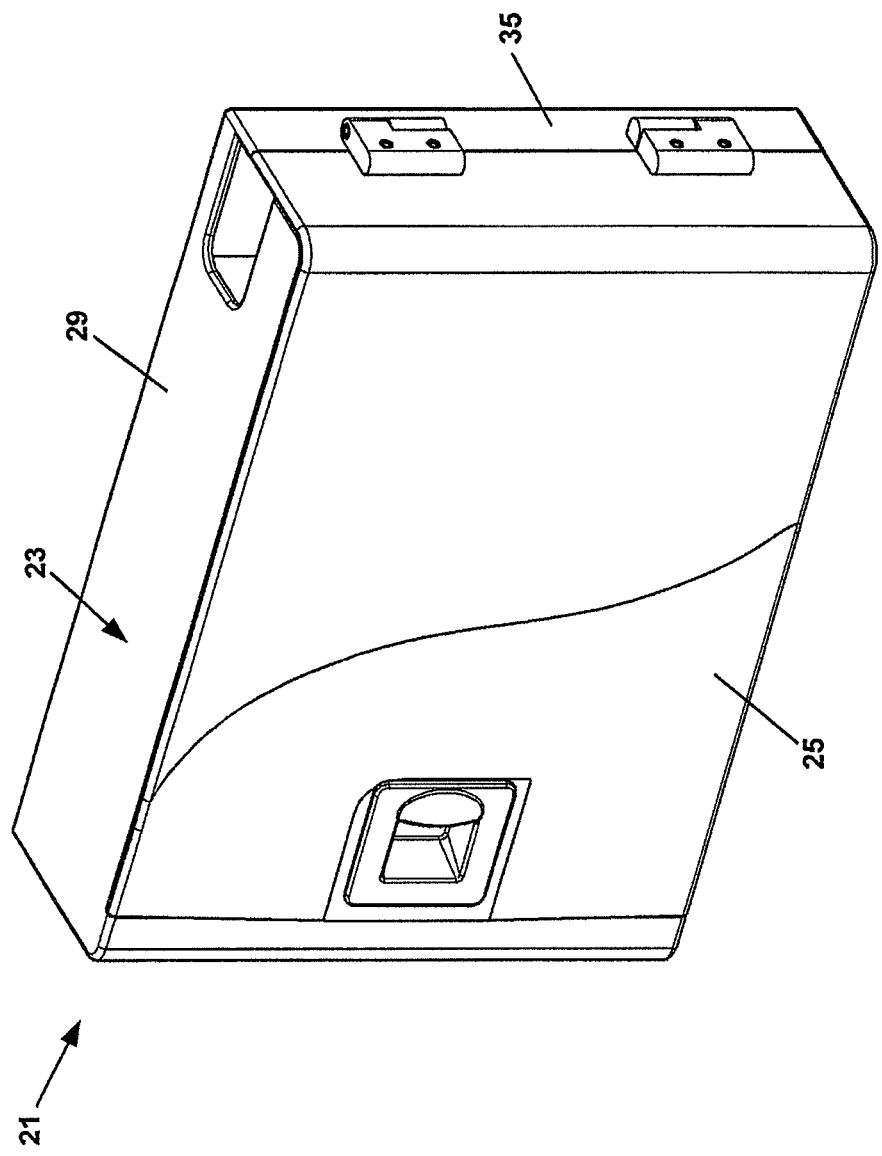
FIG. 2 is an isometric view of the fiber optic enclosure of FIG. 1.

Referring now to FIG. 1, a schematic representation of a fiber optic network, generally designated 11, in a facility 13 (e.g. individual residence, apartment, condominium, business, etc.) is shown. The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13. Each unit in the facility 13 includes a fiber optic enclosure, generally designated 21, with a subscriber cable 22 extending from each of the fiber optic enclosures 21 to the fiber distribution hub 17. The subscriber cable 22 extending between the fiber distribution hub 17 and the fiber optic enclosure 21 typically includes multiple optical fibers.

Referring now to FIGS. 2-5, the fiber optic enclosure 21 will now be described. The fiber optic enclosure 21 includes a housing, generally designated 23, having a cover 25.

The housing 23 includes a base 27, a first sidewall 29, and an oppositely disposed second sidewall 31. The first and second sidewalls 29, 31 extend outwardly from the base 27 such that the base 27 and the first and second sidewalls 29, 31 cooperatively define an interior region 33. In the subject embodiment, the cover 25 is hingedly engaged with a sidewall 35 that is connected to the base 27 and the first and second sidewalls 29, 31. It will be understood, however, that the scope of the present disclosure is not limited to the cover 25 being hingedly engaged the sidewall 35.

A cable spool, generally designated 37, is disposed in the interior region 33 of the fiber optic enclosure 21. The cable spool 37 includes a spooling portion 39, around which subscriber cable 22 is coiled (shown schematically in FIG. 1). The cable spool 37 further includes an axial end 41.

Figure 5:
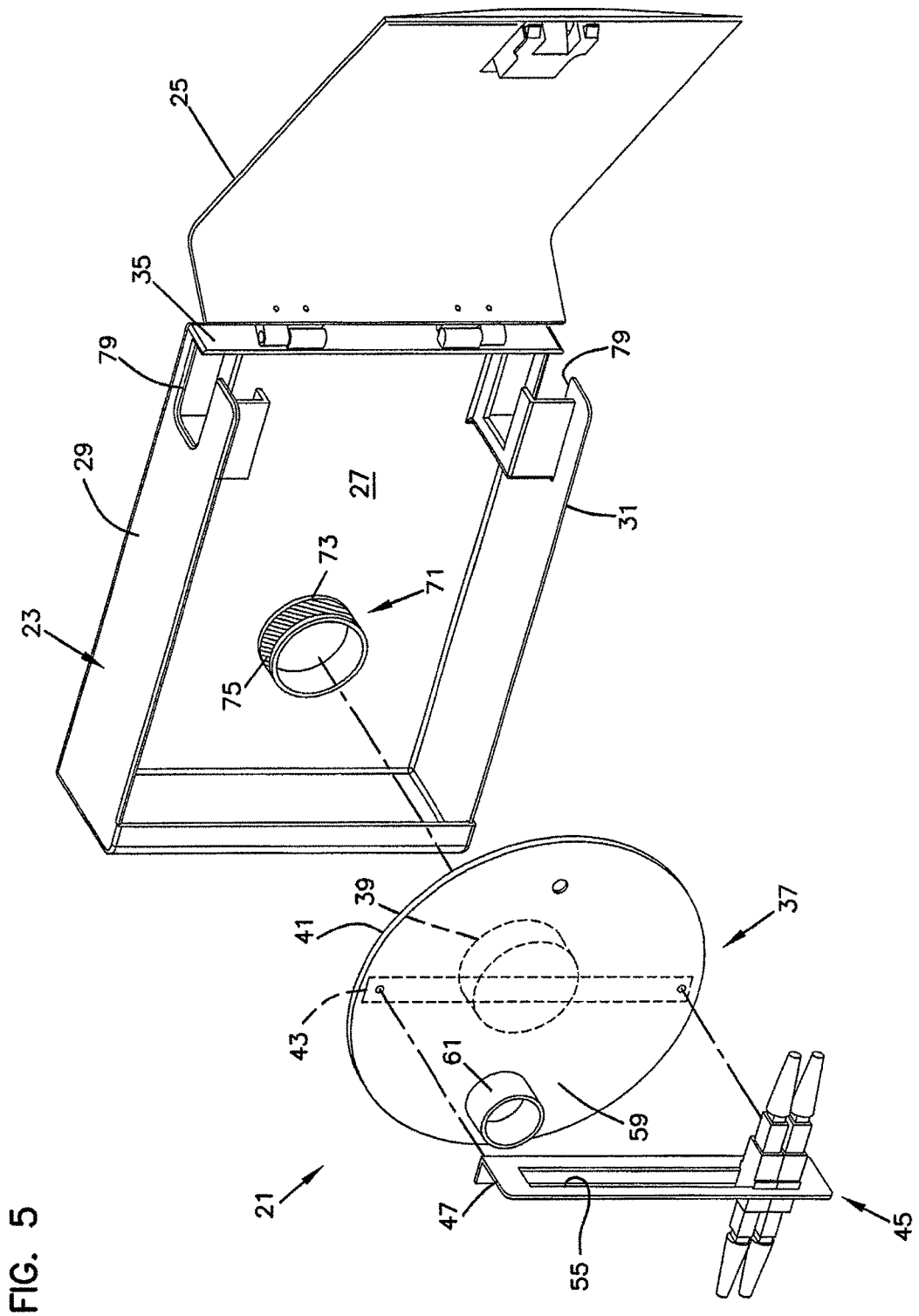
FIG. 5 is an exploded isometric view of the fiber optic enclosure of FIG. 2.

In the subject embodiment, the axial end 41 of the cable spool 37 defines a termination area 43 (shown as a dashed line in FIG. 5). Disposed in the termination area 43 is a termination module, generally designated 45. The termination module 45 of the fiber optic enclosure 21 serves as the dividing line between the incoming fibers and the outgoing fibers.

In the subject embodiment, the termination module 45 includes an adapter plate 47. The adapter plate 47 is an L-shaped bracket having a first side 49 (shown in FIG. 4) and a second side 51. The first side 49 defines a plurality of mounting holes 53 while the second side 51 defines an adapter slot 55. It will be understood, however, that the scope of the present disclosure is not limited to the adapter plate 47 being an L-shaped bracket. The first side 49 of the adapter plate 47 is rigidly mounted (i.e., non-rotatable) to the axial end 41 of the cable spool 37 through a plurality of fasteners 57 (e.g., bolts, screws, rivets, etc.) which are inserted through the mounting holes 53 in the first side 49 and in connected engagement with the axial end 41 of the cable spool 37.

The adapter slot 55 in the second side 51 of the adapter plate 47 is adapted to receive a plurality of adapters, generally designated 401. In the subject embodiment, the adapters 401 are SC-type adapters 401, although it will be understood that the scope of the present disclosure is not limited to the use of SC-type adapters 401. Similar SC-type adapters 401 have been described in detail in commonly owned U.S. Pat. No. 5,317,663, the disclosure of which is incorporated herein by reference.

Figure 6:
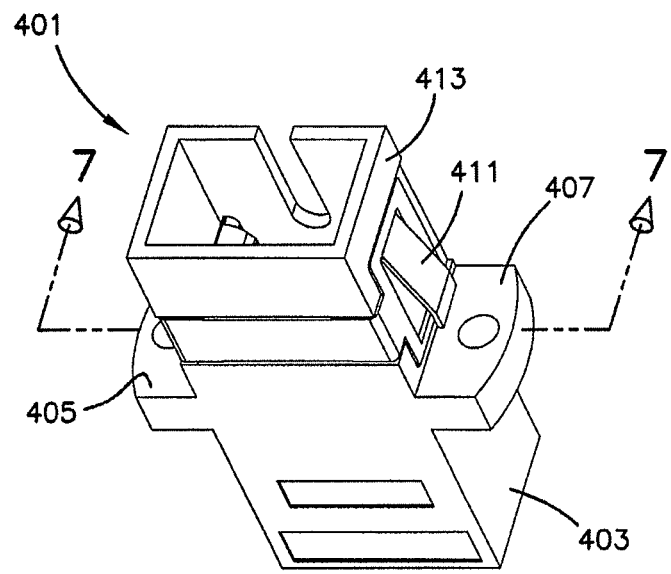
FIG. 6 is a perspective view of a fiber optic adapter suitable for use within the fiber optic enclosure of FIG. 2.
Figure 7:
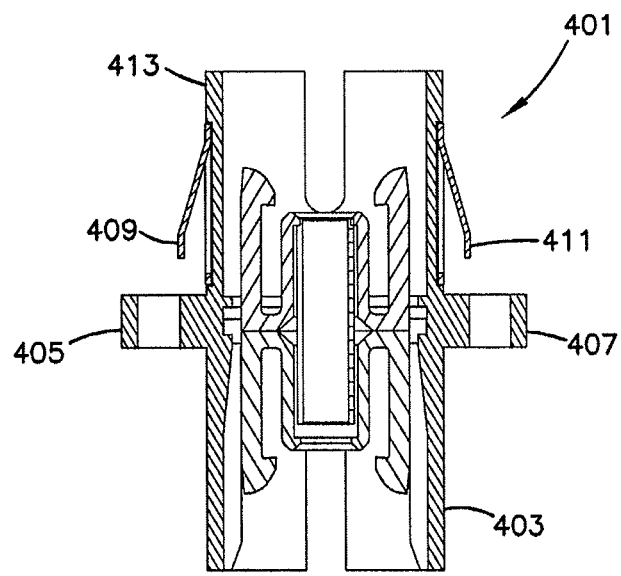
FIG. 7 is a cross-sectional view of the fiber optic adapter taken on line 7-7 of FIG. 6.
Figure 8:
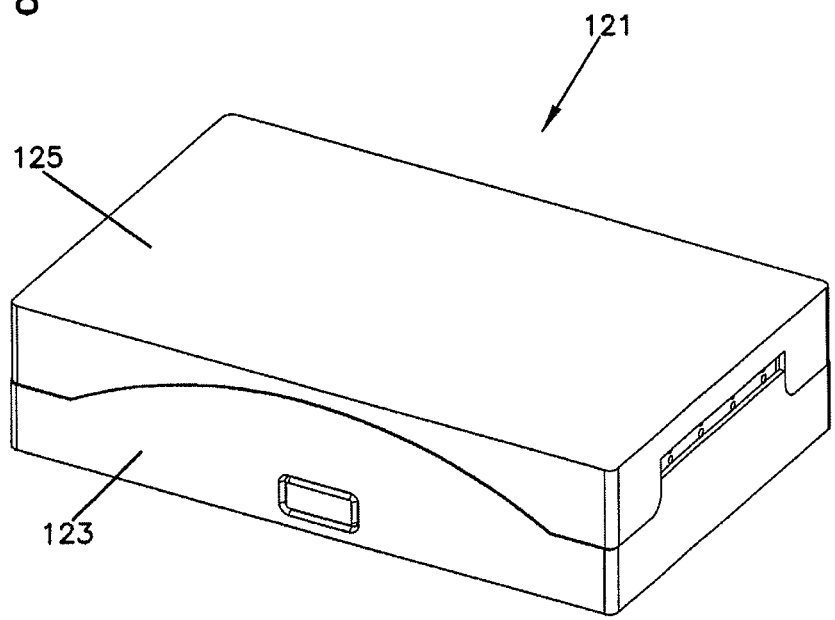
FIG. 8 is an isometric view of another embodiment of a fiber optic enclosure.
Figure 9:
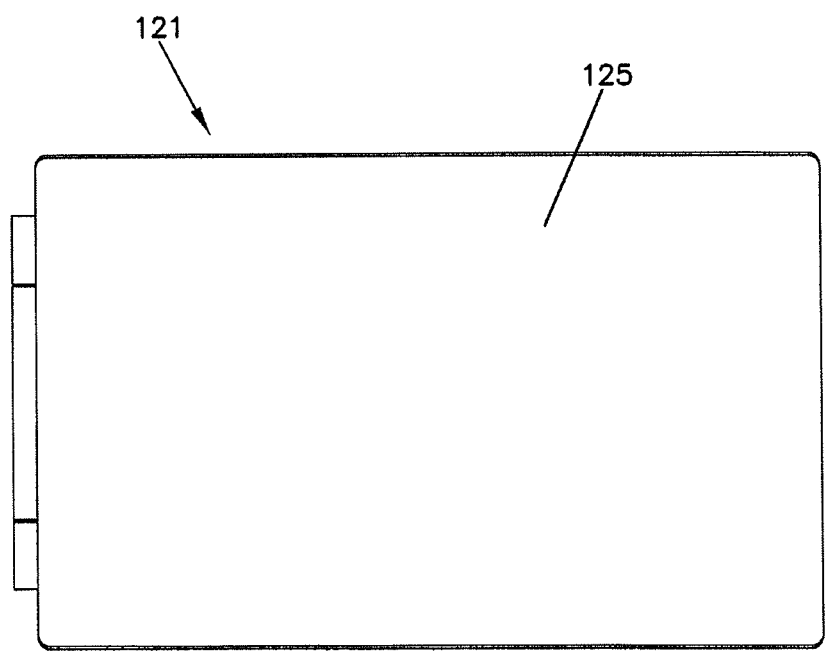
FIG. 9 is a front view of the fiber optic enclosure of FIG. 8.
Figure 10:
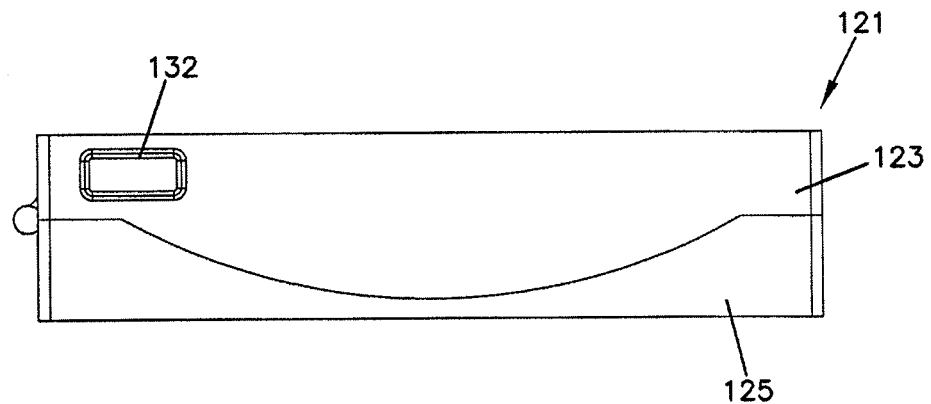
FIG. 10 is a top view of the fiber optic enclosure of FIG. 8.
Figure 11:
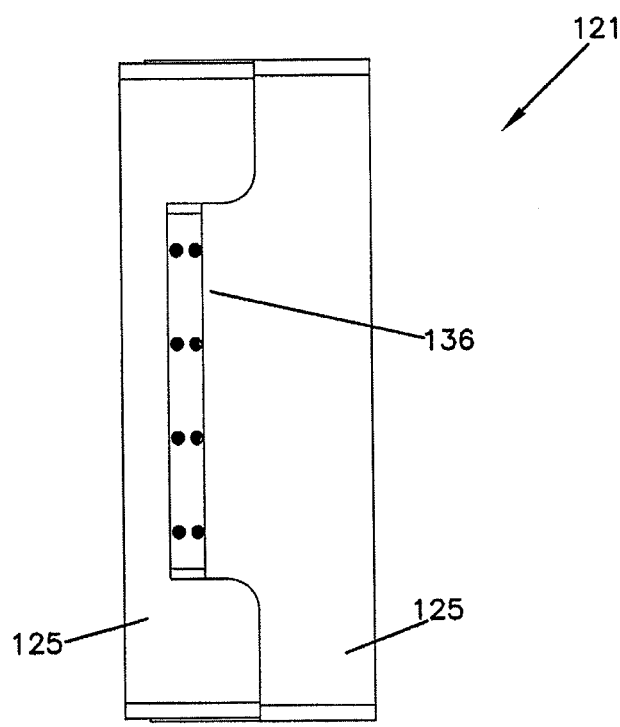
FIG. 11 is a side view of the fiber optic enclosure of FIG. 8.
Figure 12:
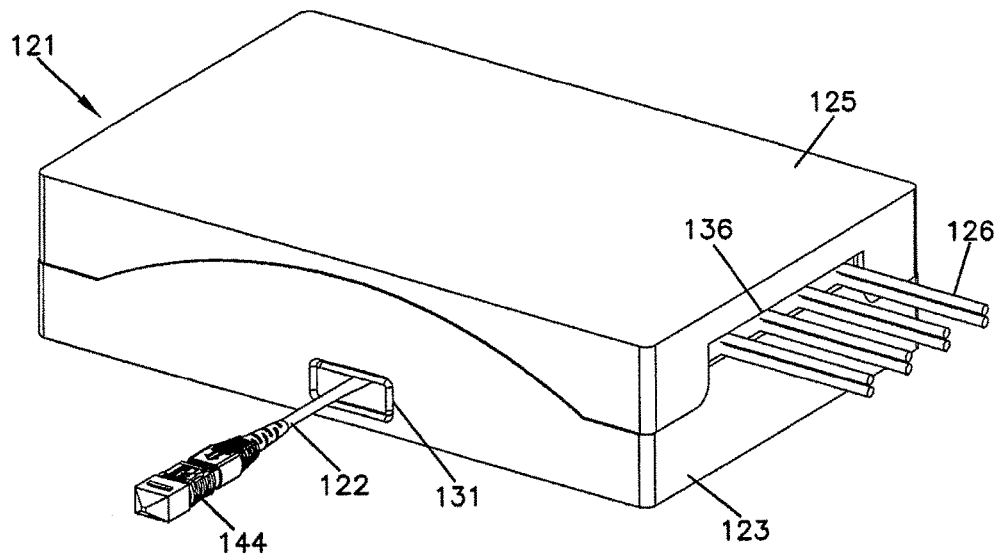
FIG. 12 is an isometric view of the fiber optic enclosure of FIG. 8, showing cables entering and exiting the enclosure.

Referring now to FIGS. 6 and 7, the SC-type adapter 401 includes a main body 403 with a pair of tabs 405, 407 located on the exterior of the main body 403. The tabs 405, 407 serve to support the adapter 401 in the adapter slot 55. The adapter 401 further includes a pair of retaining clips 409, 411, with one retaining clip 409, 411 associated with each tab 405, 407. A front side 413 of the adapter 401 is inserted into the adapter slot 55. As the adapter 401 is inserted through the adapter slot 55, the retaining clips 409, 411 compress against the main body 403. The adapter 401 is inserted into the adapter slot 55 until the tabs 405, 407 abut the adapter plate 47. With the tabs 405, 407 abutting the adapter plate 47, the retaining clips 409, 411 decompress on the opposite side of the adapter plate 47, thereby retaining the adapter plate 47 between the retaining clips 409, 411 and the tabs 405, 407.

In an alternate embodiment, the termination module includes a plurality of sliding adapter modules. Similar sliding adapter modules have been described in detail in commonly owned U.S. Pat. Nos. 5,497,444; 5,717,810, 6,591,051 and U.S. Pat. Pub. No. 2007/0025675, the disclosures of which are incorporated herein by reference.

Figure 3:
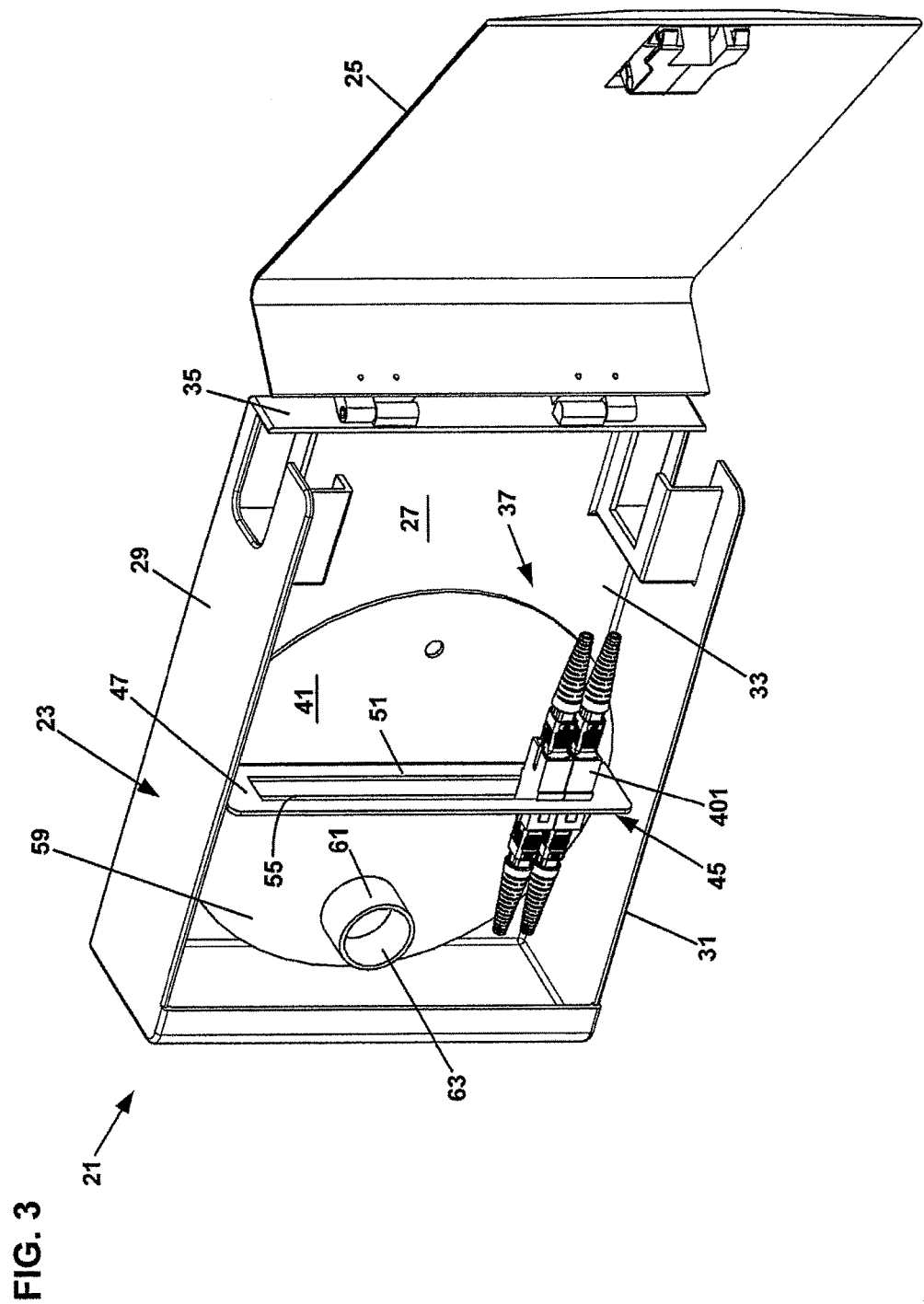
FIG. 3 is an isometric view of the fiber optic enclosure of FIG. 2 with a cover in an open position.
Figure 4:
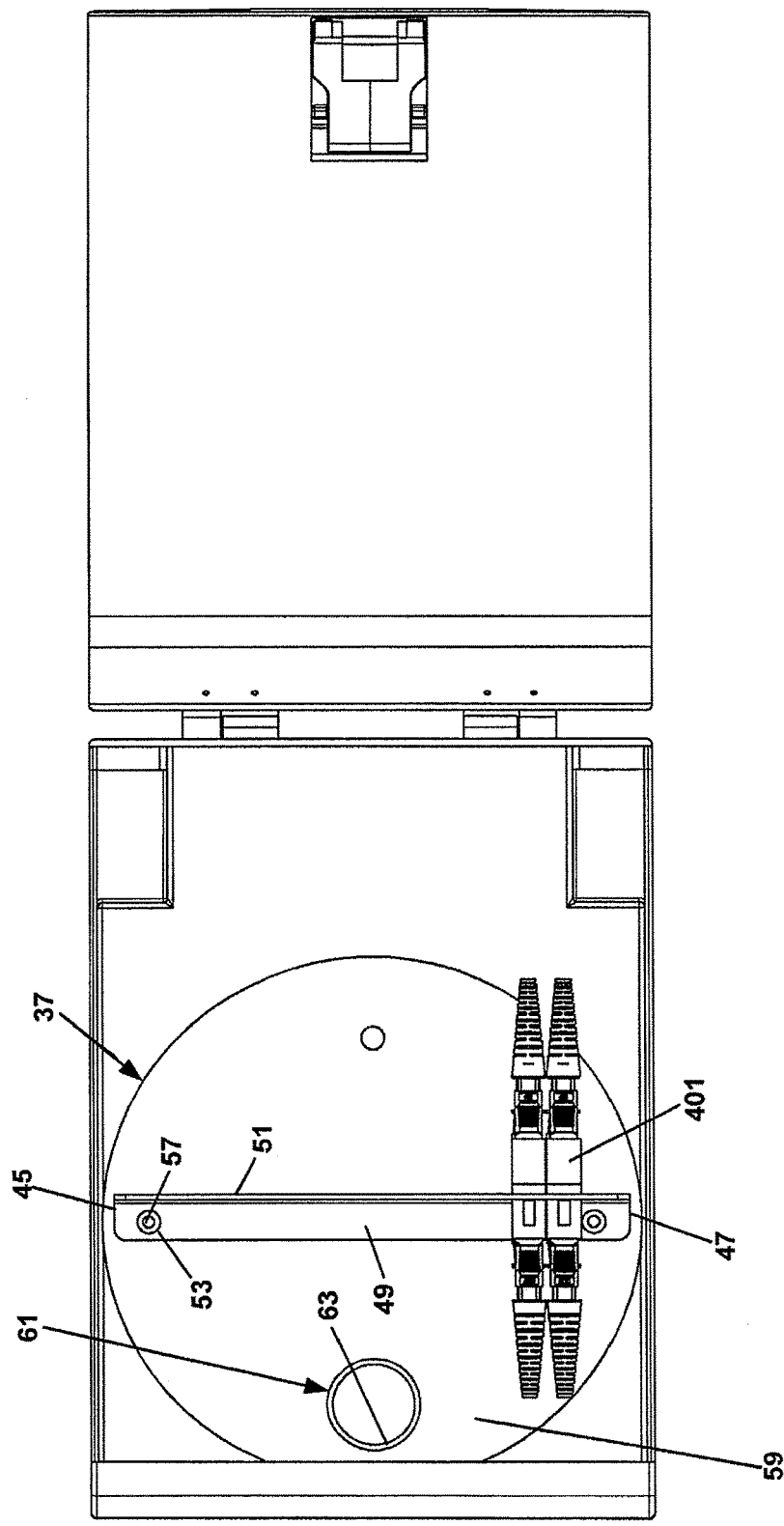
FIG. 4 is a front view of the fiber optic enclosure of FIG. 2 with the cover in the open position.

Referring now to FIGS. 3-5, the axial end 41 of the cable spool 37 further defines a slack storage area 59. The slack storage area 59 includes a cable management spool 61 disposed on the axial end 41 of the cable spool 37. The cable management spool 61 is sized such that an outer radius of the cable management spool 61 is larger than the minimum bend radius of the optical fibers so as to avoid attenuation damage to the optical fibers during storage.

The cable management spool 61 and the axial end 41 of the cable spool 37 cooperatively define a cable passage 63 that extends axially through the cable management spool 61 and through the axial end 41 of the cable spool 37. The cable passage 63 allows connectorized ends of incoming optical fibers to pass from the spooling portion 39 of the cable spool 37 to the slack storage area 59. The connectorized ends of the incoming optical fibers are then routed from the slack storage area 59 to the front sides 413 of the adapters 401 in the termination area 43.

Referring now to FIG. 5, the fiber optic enclosure 21 further includes a bearing mount, generally designated 71. In the subject embodiment, the bearing mount 71 is disposed on the base 27 of the housing 23. An outer surface 73 of the bearing mount 71 is adapted for a bearing 75 (shown as cross-hatching). In the subject embodiment, the bearing 75 is a needle bearing. However, it will be understood that the scope of the present disclosure is not limited to the bearing 75 being a needle bearing as the bearing 75 could also include a bushing, low-friction coating, etc.

In one embodiment, the bearing 75 is engaged with an inner diameter of a central hole of the cable spool 37. In another embodiment, a rotary plain bearing is formed between the outer surface 73 of the bearing mount 71 and the inner diameter of the central hole of the cable spool 37. In this embodiment, the outer diameter of the bearing mount 71 is sized to fit within an inner diameter of a central hole of the spooling portion 39. The engagement of the bearing mount 71 and the spooling portion 39 of the cable spool 37 allows the cable spool 37 to rotate about the central axis 77 of the bearing mount 71.

Referring now to FIGS. 1 and 5, the subscriber cable 22, which includes multiple optical fibers, is coiled around the spooling portion 39 of the cable spool 37. In order to protect the subscriber cable 22 from attenuation resulting from the coiling of the subscriber cable 22 around the spooling portion 39, the cable spool 37 has an outer circumferential surface having a radius that is greater than the minimum bend radius of the subscriber cable 22. The subscriber cable 22 includes a first end having connectorized ends, which are inserted through the cable passage 63 and connectedly engaged with the first ends 413 of the adapters 401. A second end of the subscriber cable 22 is configured for connectivity with the fiber distribution hub 17. However, as shown in FIG. 1, the length of subscriber cable 22 needed between each of the fiber optic enclosures 21 in the facility 13 and the fiber distribution hub 17 will vary depending upon the location of each fiber optic enclosure 21 with respect to the fiber distribution hub 17.

A method of installing and using the fiber optic enclosure 21 to account for the varying lengths of subscriber cable 22 needed between the fiber optic enclosure 21 and the fiber distribution hub 17 will now be described. The fiber optic enclosure 21 provides dual functionality by serving as a storage location for the subscriber cable 22 and by selectively paying out a desired length of the subscriber cable 22.

A first length of subscriber cable 22 is stored in the fiber optic enclosure 21 by coiling the length of subscriber cable 22 around the cable spool 37. The first length of subscriber cable 22 includes an installation length, which is sufficiently long to extend from the mounting location of the enclosure 28 to the fiber distribution hub 17, and an excess length, which is the length of subscriber cable 22 remaining on the cable spool 37 after the installation length has been paid out. In one embodiment, the first length is greater than or equal to about 100 feet. In another embodiment, the first length of subscriber cable 22 is greater than or equal to about 200 feet. In another embodiment, the first length of subscriber cable 22 is greater than or equal to about 300 feet. In another embodiment, the first length of subscriber cable 22 is greater than or equal to about 400 feet. In another embodiment, the first length of subscriber cable 22 is greater than or equal to about 500 feet. In another embodiment, the first length of subscriber cable 22 is in the range of about 100 to about 2,000 feet. In another embodiment, the first length of subscriber cable 22 is in the range of about 100 to about 1,500 feet. In another embodiment, the first length of subscriber cable 22 is in the range of about 500 to about 1,500 feet. In a preferred embodiment, the first length of subscriber cable 22, which is coiled around the cable spool 89, is in the range of 100 to 500 feet.

In one embodiment, a second length, or the excess length, of subscriber cable 22 is stored around the cable spool 37 after the first length of subscriber cable 22 has been paid out. If the first length of subscriber cable 22 is greater than the installation length of subscriber cable 22, the second length, or excess length, is stored around the cable spool 37.

The second function of the fiber optic enclosure 21 involves the selective payout of the subscriber cable 22. With the cable spool 37 mounted to the bearing mount 71, the first end of the subscriber cable 22 in connected engagement with the front sides 413 of the adapters 401 and the outgoing optical fibers disengaged from the back sides of the adapters 401, the subscriber cable 22 can be paid out through fiber ports 79 disposed in the first and second sidewalls 29, 31. The subscriber cable 22 is paid out of the fiber optic enclosure 21 by selectively rotating the cable spool 37 with respect to the housing 23 about the central axis 77 of the bearing mount 71. As the termination module 45 is disposed on the axial end 41 of the cable spool 37, the selective rotation of the cable spool 37 with respect to the housing 23 results in the selective rotation of the termination module 45. Since the termination module 45 rotates unitarily with or in unison with the cable spool 37, the second end of the subscriber cable 22 can be paid out without the first end of the subscriber cable 22 being pulled out of the termination module 45.

Once the desired length of subscriber cable 22 has been paid out, the rotation of the cable spool 37 is ceased. At this point, the position of the cable spool 37 can be fixed such that it does not rotate relative to the housing 23. In one embodiment, a pin is inserted through an opening in the axial end 41 of the cable spool 37 and through a corresponding opening in the base 27 of the housing 23 to fix the position of the cable spool 37 with respect to the housing 23. It will be understood, however, that the scope of the present disclosure is not limited to the use of a pin to fix the position of the cable spool 37 with respect to housing 23.

An alternate method of selectively paying-out subscriber cable 22 from the fiber optic enclosure 21 will now be described. With the fiber optic enclosure 21 positioned near the fiber distribution hub 17, the second end of the subscriber cable 22 is unwound from the cable spool 37. In one embodiment, the second end is optically connected to the fiber distribution hub 17. With the second end of the subscriber cable 22 optically connected to the fiber distribution hub 17 and the first end of the subscriber cable 22 in connected engagement with the termination module 45, the fiber optic enclosure 21 is transported away from the fiber distribution hub 17. In one embodiment, the fiber optic enclosure 21 is carried away from the fiber distribution hub 17 by an installer. In another embodiment, the fiber optic enclosure 21 is transported away from the fiber distribution hub 17 in a wheeled cart (e.g., dolly, 4-wheeled cart, etc.). In a preferred embodiment, the fiber optic enclosure is disposed in a packaging enclosure (e.g., a box) during transport. As the fiber optic enclosure 21 is transported away from the fiber distribution hub 17, the subscriber cable 22 unwinds from the cable spool 37 causing the cable spool 37 to rotate within the interior region 33 of the housing 23, which is disposed in the packaging enclosure. When the fiber optic enclosure 21 has been transported to its mounting location, the fiber optic enclosure 21 is removed from the packaging enclosure, mounted to the mounting location. The cable spool 37 can be fixed in position relative to the housing 23 to prevent inadvertent rotation of the cable spool 37.

Referring now to FIGS. 8-18, an alternate embodiment of a fiber optic enclosure 121 is shown. The fiber optic enclosure 121 includes a housing 123 and a hinged cover 125.

The housing 123 includes a base wall 120, a first sidewall 127 and an oppositely disposed second sidewall 128. The first and second sidewalls 127, 128 extend outwardly from the base wall 120 such that the base wall 120 and the first and second sidewalls 127, 128 cooperatively define an interior region 130.

In the subject embodiment, the first sidewall 127 of the housing 123 defines a first port 131 while the second sidewall 128 defines a second port 132. The subscriber cable 122 enters/exits the fiber optic enclosure 121 at the first port 131 or at the second port 132. In the subject embodiment, both of the first and second ports 131, 132 are provided as knockout portions.

A cable spool 137 is positioned within the interior region 130 of enclosure 121. In the subject embodiment, the cable spool 137 is adapted for rotation within the interior region 130 of the enclosure 121. In the subject embodiment, the cable spool 137 includes a first axial end 136, an oppositely disposed second axial end 138 and a spool portion 139. The spool portion 139 is disposed between the first and second axial ends 136, 138 of the cable spool 137. The spool portion 139 is adapted to receive a subscriber cable 122 coiled around or spooled on the spool portion 139.

With the subscriber cable 122 spooled on the spool portion 139, the subscriber cable 122 can be selectively paid out by rotating the cable spool 137. As the cable spool 137 is rotated, the subscriber cable 122 is unwound from the spool portion 139 of the cable spool 137. After a desired length of subscriber cable 122 has been paid out, pin openings 141 can be used with a pin to fix the position of cable spool 137 relative to housing 123.

The subscriber cable 122 is shown with a connectorized end 144 (e.g., MTP connector) for connecting to the fiber distribution hub 17 or other equipment. An opposite end of the subscriber cable 122 passes through an opening 145 disposed in the first axial end 136 of the cable spool 137. After passing through the opening 145, the subscriber cable 122 is routed to a fanout 147 disposed on the first axial end 136 of the cable spool 137 where the cable is broken out into individual fibers 124 having connectorized ends 146 (e.g., SC connectors).

A cable management spool 161 is also disposed on the first axial end 136 of the cable spool 137. The cable management spool 161 manages fibers 124. In the subject embodiment, the cable management spool 161 includes a plurality of fingers 162 disposed on an end of the cable management spool 161. The fingers 162 assist with cable retention.

The first axial end 136 of the cable spool 137 further includes an outer guide wall 163. In the subject embodiment, the outer guide wall 163 is disposed at a portion of the peripheral edge of the first axial end 136 adjacent to the cable management spool 161. In the subject embodiment, the outer guide wall 163 extends outwardly in a direction that is generally perpendicular to the first axial end 136.

The outer guide wall 163 includes with a cable finger 164 disposed at an end of the outer guide wall 163 that is opposite the end engaged with the first axial end 136 of the cable spool 137. The cable finger 164 assists with retention and protection of the fibers 124.

An adapter plate 149 is disposed on the first axial end 136 of the cable spool 137. In the subject embodiment, the adapter plate 149 includes separate openings 151. Each of the separate openings 151 is adapted to receive two adapters 401.

Figure 16:
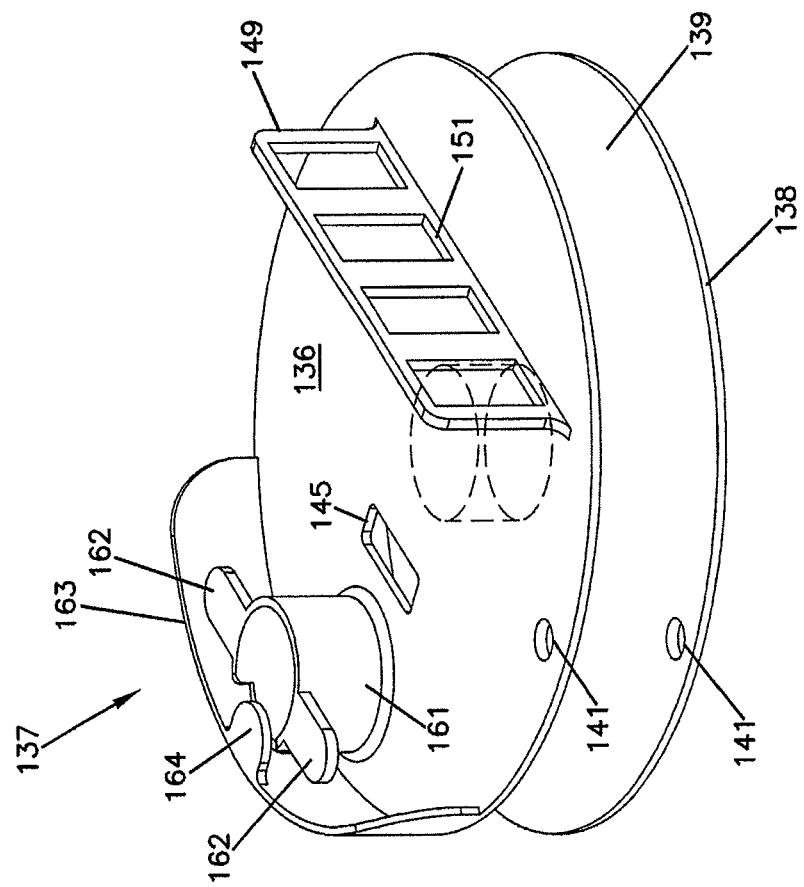
FIG. 16 is an isometric view of the cable spool of the fiber optic enclosure of FIG. 13.

In the depicted embodiment of FIG. 16, the cable management spool 161, the outer guide wall 163 and the adapter plate 149 are integrally formed with the first axial end 136 of the cable spool 137. In the subject embodiment, the first axial end 136 of the cable spool 137 is formed from plastic. In another embodiment, the first and second axial ends 136, 138, the spool portion 139, the adapter plate 149, the cable management spool 161 and the outer guide wall 163 are integrally formed from a plastic material.

Figure 13:
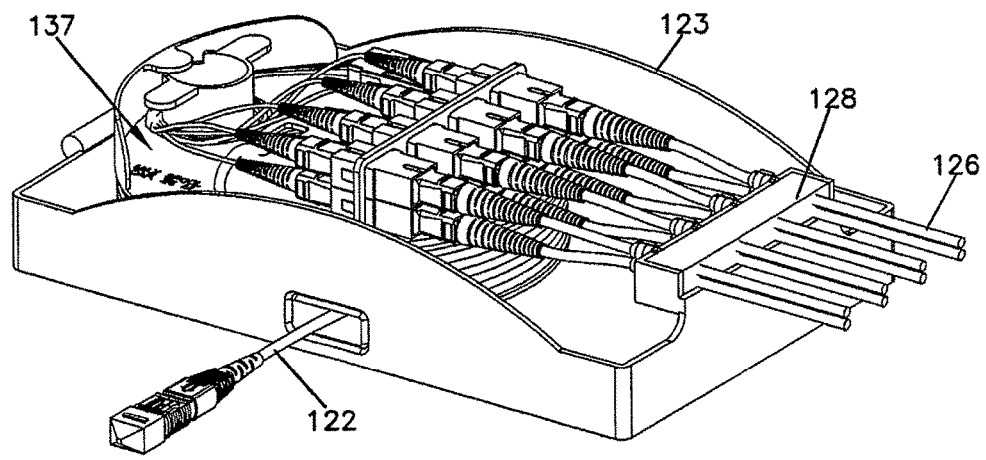
FIG. 13 is an isometric view of the fiber optic enclosure of FIG. 12 without the cover.
Figure 14:
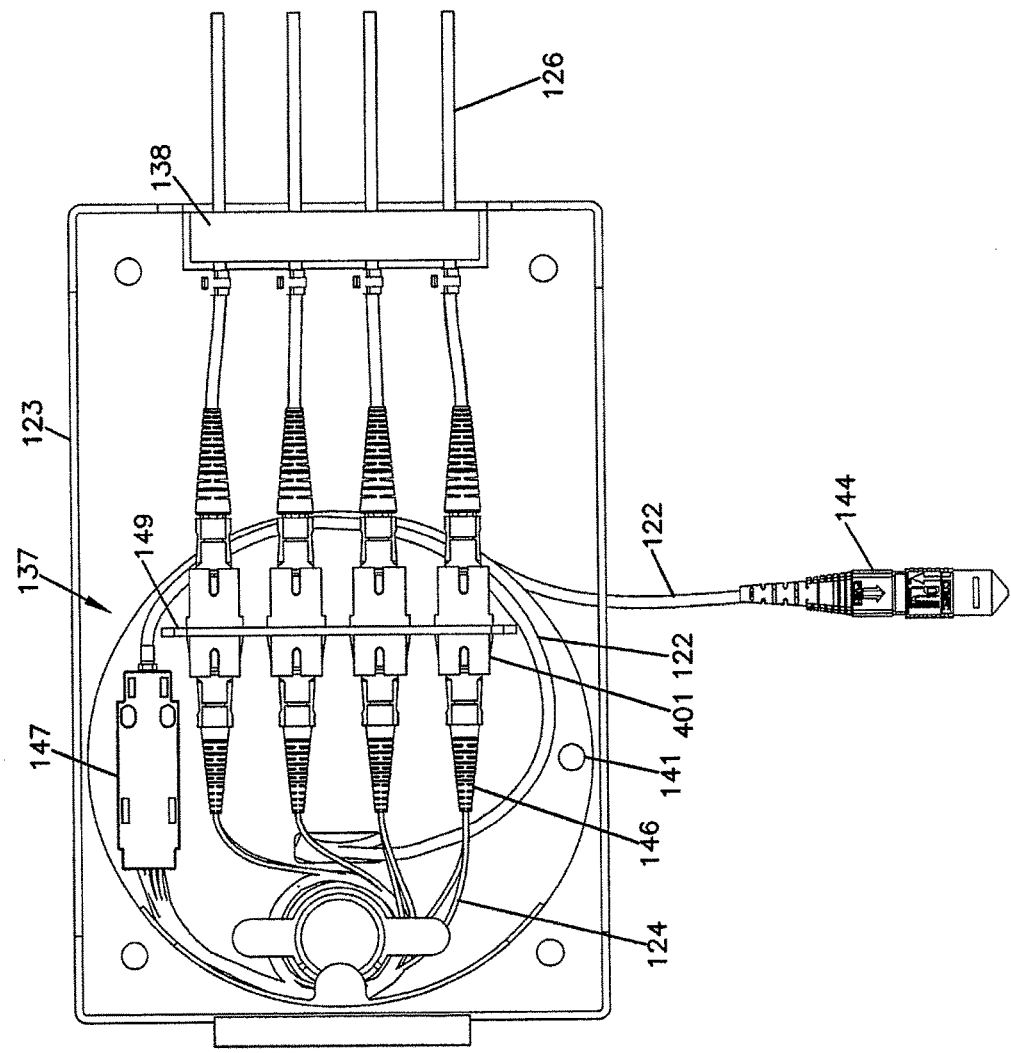
FIG. 14 is a front view of the fiber optic enclosure of FIG. 13.
Figure 15:
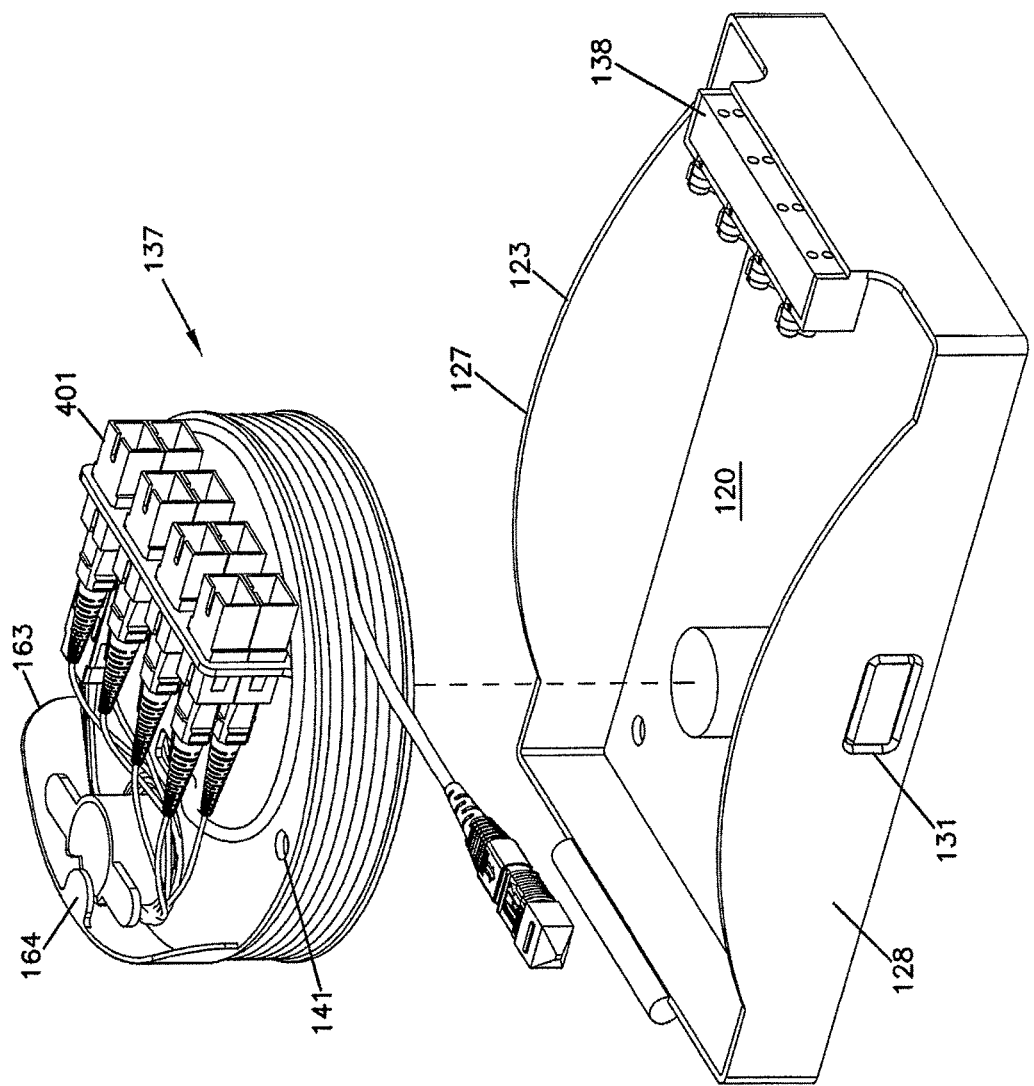
FIG. 15 is an exploded isometric view of the fiber optic enclosure of FIG. 13.

Referring now to FIGS. 13 and 14, the fiber optic enclosure 121 is shown connected to a second subscriber cable 126. After the subscriber cable 122 is paid out and cable spool 137 fixed in position relative to the housing 123, individual connectorized ends of the second subscriber cables 126 can be connected to the fibers 124 at adapters 401 of adapter plate 149. The second subscriber cables 126 exit the fiber optic enclosure 121 at a port 136 in a side 165 of the housing 123. In the illustrated embodiment, a slotted foam member 138 is disposed in the port 136. The slotted foam member 138 includes a plurality of slots through which the second subscriber cables 126 can be inserted in order to prevent or reduce the risk of ingress of environmental contamination (e.g., dust, water, etc.).

Figure 17:
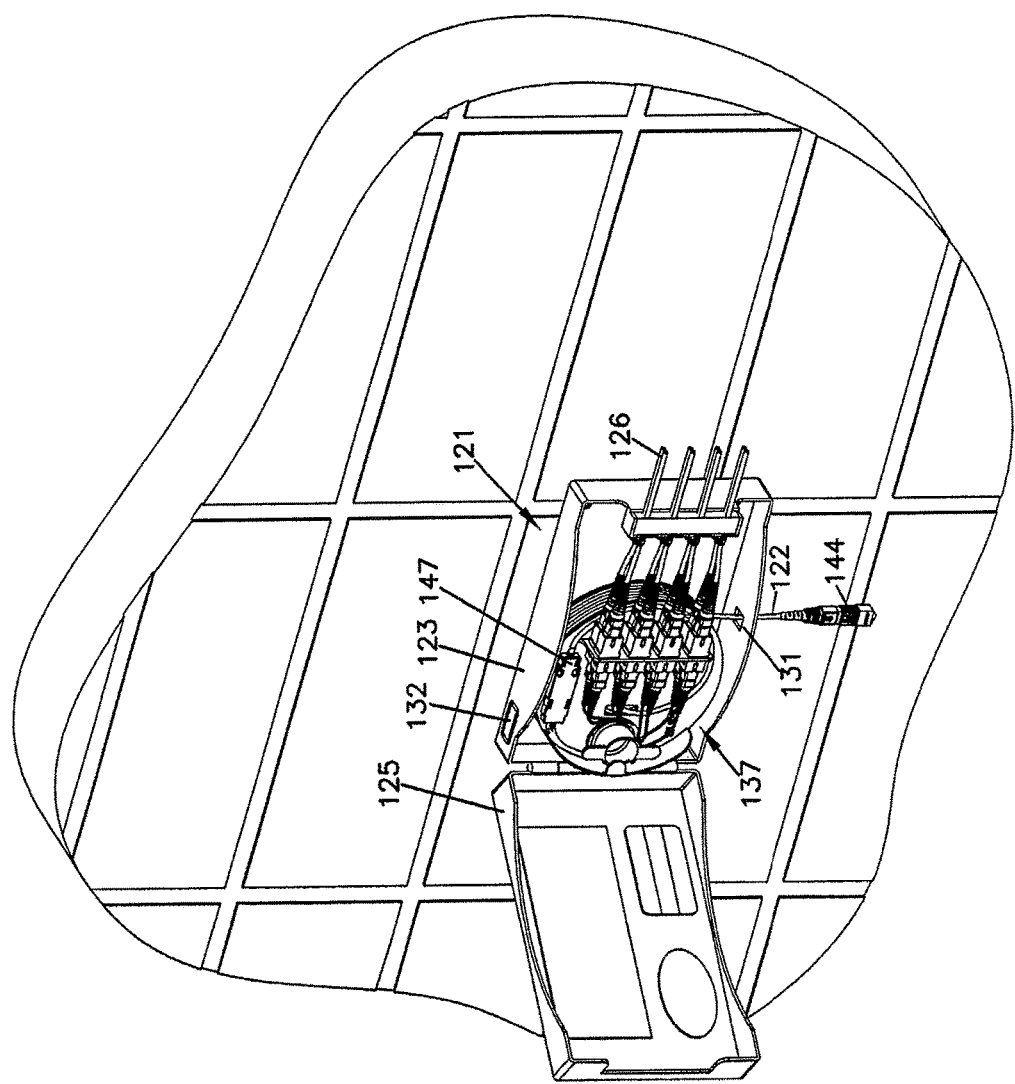
FIG. 17 is a further isometric view of the fiber optic enclosure of FIG. 12, with the cover in the pivoted open position.
Figure 18:
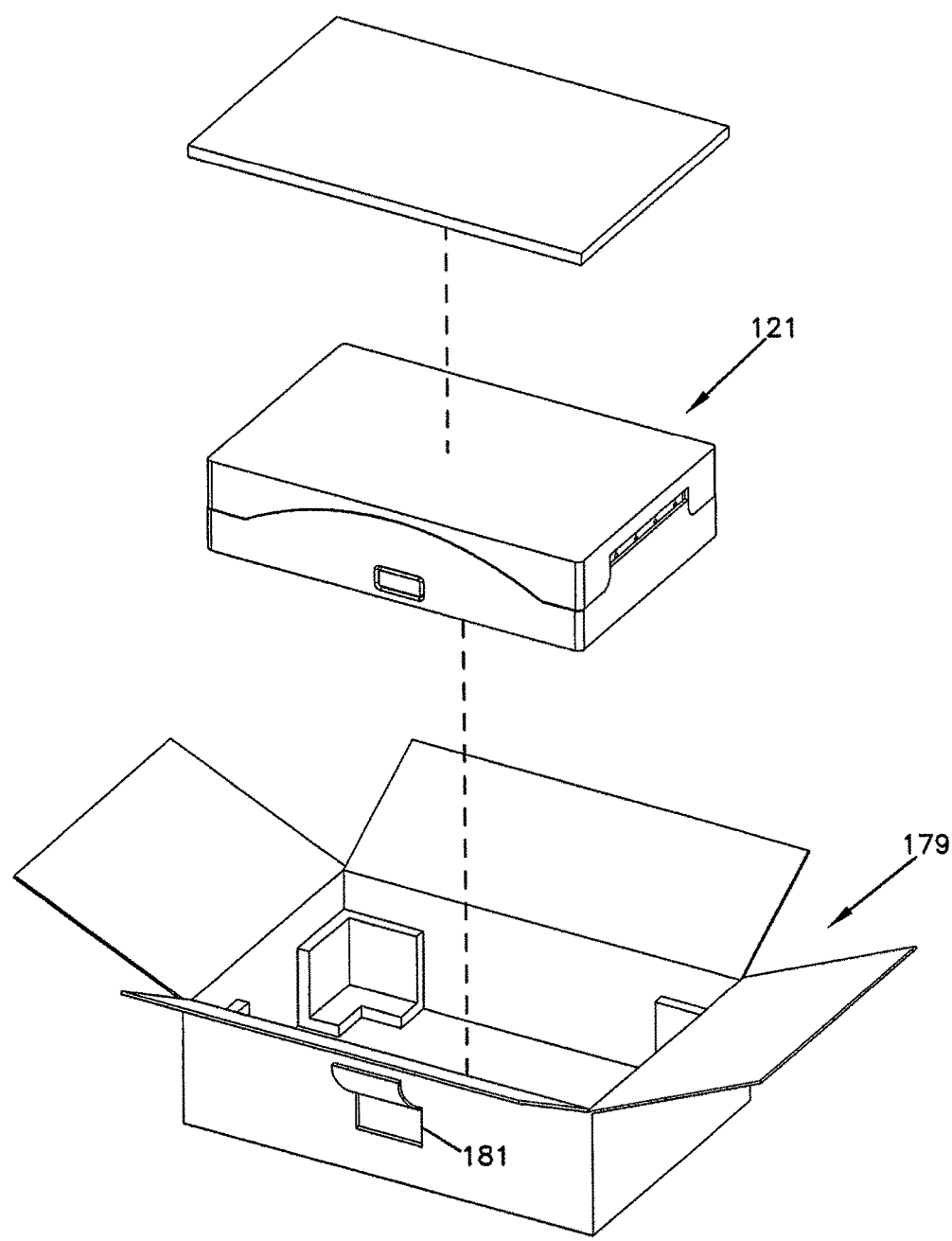
FIG. 18 is an exploded view of a shipping container in which is disposed the fiber optic enclosure of FIG. 8.

While the fiber optic enclosure 121 is shown mounted to a mounting location 183 (e.g., wall, pole, etc.) in FIGS. 1 and 17, it will be understood that the subscriber cable 122 can be paid out from the fiber optic enclosure 121 while the fiber optic enclosure 121 is either mounted to a mounting location 183 or removed from the mounting location 183. As shown in FIG. 18, the subscriber cable 122 could be paid out while the fiber optic enclosure 121 is still packaged in a shipping container 179 provided there is an opening 181 in the shipping container 179 through which the subscriber cable 122 can be pulled. After the subscriber cable 122 has been paid out, the fiber optic enclosure 121 can be removed from the shipping container 179 and mounted to the mounting location 183.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A method of connecting a subscriber to a fiber optic network using a fiber optic enclosure, the fiber optic enclosure including a main housing, a cable spool disposed within an interior of the main housing, an adapter disposed within the interior of the main housing, and a cover that selectively provides and blocks access to the interior of the main housing, the cable spool holding at least a portion of an optical cable that includes an optical fiber extending between a first end and a second end, the first end being terminated at a first optical connector and the second end being terminated at a second optical connector, the method comprising:
    paying out a portion of the optical cable from the cable spool by rotating the cable spool while the second optical connector rotates in concert with the cable spool;
    opening the cover to provide access to the interior of the main housing;
    routing a connectorized end of a subscriber cable into the interior of the main housing;
    plugging the connectorized end of the subscriber cable into the adapter; and
    closing the cover to block access to the interior of the main housing after the subscriber cable is plugged into the adapter, wherein the adapter, the second optical connector, and the connectorized end of the subscriber cable remain disposed within the interior of the main housing when the cover is closed.

2. The method of claim 1, wherein the adapter rotates in concert with the cable spool.

3. The method of claim 1, further comprising mounting the main housing to a surface.

4. The method of claim 1, wherein paying out the portion of the optical cable includes pulling on the optical cable at the first optical connector.

5. The method of claim 1, wherein the second optical connector is plugged into the adapter before paying out the portion of the optical cable.

6. The method of claim 1, further comprising optically coupling the first optical connector to the fiber optic network at a location remote from the fiber optic enclosure.

7. The method of claim 1, wherein optically coupling the first optical connector to the fiber optic network is performed before mounting the main housing to the surface.

8. The method of claim 1, wherein optically coupling the first optical connector to the fiber optic network is performed after mounting the main housing to the surface.

9. The method of claim 1, wherein opening the cover comprises pivoting the cover relative to the main housing.

10. The method of claim 1, wherein routing the connectorized end of the subscriber cable into the interior of the main housing comprises routing the connectorized end through a cable port.

11. The method of claim 10, wherein the main housing and the cover cooperate to define the cable port.

12. The method of claim 10, wherein the cable port is environmentally sealed.

13. The method of claim 12, wherein the cable port is sealed using a slitted sealing member.

14. The method of claim 12, wherein the cable port is sealed using a slitted foam member.

15. The method of claim 1, wherein the optical fiber is one of a plurality of optical fibers of the optical cable, and wherein a respective first end of each of the plurality of optical fibers is terminated at the first optical connector.

16. The method of claim 15, wherein a respective second end of each of the plurality of optical fibers is separately terminated at a respective second optical connector, each of the respective second optical connectors rotating in concert with the cable spool when the optical cable is paid out from the cable spool.

17. The method of claim 16, wherein the adapter is one of a plurality of adapters disposed within the interior of the main housing; and wherein each of the respective second optical connectors is plugged into one of the plurality of adapters.

18. The method of claim 17, wherein connectorized ends of additional subscriber cables are routed into the interior of the main housing and plugged into respective ones of the plurality of adapters when the cover is open.

19. The method of claim 1, wherein the cable spool rotates about an axis of rotation oriented to intersect the cover when the cover blocks access to the interior of the main housing.

20. A method of connecting a subscriber to a fiber optic network using a fiber optic enclosure, the fiber optical enclosure including a main housing and a cover, the main housing having opposite rear and front sides, the cover being movable relative to the main housing between an open position and a closed position, the cover blocking access to an interior of the main housing through the front side when in the closed position and allowing access to the interior through the front side when in the open position, the method comprising:
   paying out an optical cable from a cable spool disposed within the interior of the main housing, the optical cable extending between a first end and a second end, the first end being routed away from the interior of the main housing while the optical cable is being paid out, the second end rotating in unison with the cable spool within the interior of the main housing while the optical cable is being paid out;
   routing an end of a subscriber cable into the interior of the main housing while the cover is in the open position;
   optically coupling the end of the subscriber cable to the second end of the optical cable at an optical adapter disposed within the interior of the main housing while the cover is in the open position; and
   moving the cover to the closed position to enclose the optical adapter, the end of the subscriber cable, and the second end of the cable within the interior of the main housing.

21. The method of claim 20, wherein paying out the optical cable includes pulling on the first end of the optical cable.

22. The method of claim 20, wherein the optical cable includes a plurality of optical fibers, wherein the plurality of optical fibers are connectorized at a multi-fiber connector at the first end of the optical cable; and wherein the plurality of optical fibers are individually connectorized at single-fiber connectors at the second end of the optical cable.

23. The method of claim 22, wherein the subscriber cable is one of a plurality of subscriber cables and the optical adapter is one of a plurality of optical adapters, and wherein the method further comprises:
   plugging each of the single-fiber connectors into respective ones of the plurality of optical adapters within the interior of the main housing while the cover is in the open position; and
   plugging connectorized ends of the subscriber cables into respective ones of the plurality of optical adapters while the cover is in the open position;
   wherein moving the cover to the closed position encloses the plurality of optical adapters, the single-fiber connectors, and the connectorized ends of the plurality of subscriber cables.

24. The method of claim 20, further comprising mounting the rear side of the main housing to a wall.

25. A method of connecting a subscriber to a fiber optic network using a fiber optic enclosure, the fiber optical enclosure including a main housing and a cover, the main housing having opposite rear and front sides, the cover being movable relative to the main housing between an open position and a closed position, the cover blocking access to an interior of the main housing through the front side when in the closed position and allowing access to the interior through the front side when in the open position, the method comprising:
   paying out an optical cable from a cable spool disposed within the interior of the main housing, the optical cable extending between a first end and a second end, the first end being routed away from the interior of the main housing while the optical cable is being paid out, the second end rotating in unison with the cable spool within the interior of the main housing while the optical cable is being paid out;
   routing an end of a subscriber cable into the interior of the main housing while the cover is in the open position;
   optically coupling the end of the subscriber cable to the second end of the optical cable at an optical adapter disposed within the interior of the main housing while the cover is in the open position; and
   moving the cover to the closed position to enclose the optical adapter, the end of the subscriber cable, and the second end of the cable within the interior of the main housing;
   wherein the optical cable includes a plurality of optical fibers, wherein the plurality of optical fibers are connectorized at a multi-fiber connector at the first end of the optical cable; and
   wherein the plurality of optical fibers are individually connectorized at single-fiber connectors at the second end of the optical cable;
   wherein the subscriber cable is one of a plurality of subscriber cables and the optical adapter is one of a plurality of optical adapters, and wherein the method further comprises:
   plugging each of the single-fiber connectors into respective ones of the plurality of optical adapters within the interior of the main housing while the cover is in the open position; and
   plugging connectorized ends of the subscriber cables into respective ones of the plurality of optical adapters while the cover is in the open position;
   wherein moving the cover to the closed position encloses the plurality of optical adapters, the single-fiber connectors, and the connectorized ends of the plurality of subscriber cables.

* * * * *